United States Patent
Ha et al.

(10) Patent No.: US 10,248,085 B2
(45) Date of Patent: Apr. 2, 2019

(54) COMPUTATIONAL DESIGN OF ROBOTS FROM HIGH-LEVEL TASK SPECIFICATIONS

(71) Applicant: DISNEY ENTERPRISES, INC., Burbank, CA (US)

(72) Inventors: Sehoon Ha, Pittsburgh, PA (US); Alexander Nicholas Alspach, Levittown, PA (US); Joohyung Kim, Pittsburgh, PA (US); Katsu Yamane, Township of O'Hara, PA (US); Stelian Coros, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 295 days.

(21) Appl. No.: 15/292,525

(22) Filed: Oct. 13, 2016

(65) Prior Publication Data

US 2018/0107175 A1  Apr. 19, 2018

(51) Int. Cl.
*G05B 11/01* (2006.01)
*G05B 13/02* (2006.01)
*B25J 9/16* (2006.01)

(52) U.S. Cl.
CPC ........ *G05B 13/0255* (2013.01); *B25J 9/1656* (2013.01); *G05B 11/01* (2013.01);
(Continued)

(58) Field of Classification Search
None
See application file for complete search history.

(56) References Cited

U.S. PATENT DOCUMENTS 7,125,388 B1 * 10/2006 Reinkensmeyer .......... A63B 69/0064
                                                                601/5
2010/0030532 A1 * 2/2010 Arora ................. G06F 17/5009
                                                                703/2

(Continued)

OTHER PUBLICATIONS

Megaro et al. "Interactive design of 3D-printable robotic creatures", Nov. 2015, AMC Transactions on Graphics, vol. 34, Issue 6 (Year: 2015).*

(Continued)

*Primary Examiner* — Jason D Mitchell
(74) *Attorney, Agent, or Firm* — Marsh Fischmann & Breyfogle LLP; Kent A. Lembke

(57) ABSTRACT

A robot design system, and associated method, that is particularly well-suited for legged robots (e.g., monopods, bipeds, and quadrupeds). The system implements three stages or modules: (a) a motion optimization module; (b) a morphology optimization module; and (c) a link length optimization module. The motion optimization module outputs motion trajectories of the robot's center of mass (COM) and force effectors. The morphology optimization module uses as input the optimized motion trajectories and a library of modular robot components and outputs an optimized robot morphology, e.g., a parameterized mechanical design in which the number of links in each of the legs and other parameters are optimized. The link length optimization module takes this as input and outputs optimal link lengths for a particular task such that the design of a robot is more efficient. The system solves the problem of automatically designing legged robots for given locomotion tasks by numerical optimization.

18 Claims, 14 Drawing Sheets

(52) U.S. Cl.
CPC ............ *G05B 2219/34348* (2013.01); *G05B 2219/39408* (2013.01); *G05B 2219/39409* (2013.01); *G05B 2219/40099* (2013.01); *Y10S 901/15* (2013.01); *Y10S 901/27* (2013.01)

(56) References Cited

U.S. PATENT DOCUMENTS

| | | | | |
|---|---|---|---|---|
| 2011/0106303 A1* | 5/2011 | Lim | ............... | B62D 57/032 700/245 |
| 2011/0172818 A1* | 7/2011 | Kim | ............... | B25J 9/1666 700/246 |
| 2013/0226048 A1* | 8/2013 | Unluhisarcikli | ......... | A61H 3/00 601/34 |
| 2013/0238122 A1* | 9/2013 | Hodgins | ............... | B25J 9/00 700/245 |
| 2013/0310979 A1* | 11/2013 | Herr | ............... | B62D 57/032 700/258 |
| 2015/0120044 A1* | 4/2015 | Cory | ............... | B62D 57/032 700/250 |

OTHER PUBLICATIONS

Bharaj et al. "Computational design of walking automata", Aug. 2015, Proceedings of the 14th ACM SIGGRAPH, pp. 93-100 (Year: 2015).*

Paredis et al. "An approach for mapping kinematic task specifications into a manipulator design", Jun. 1991, Fifth International Conference on Advanced Robotics, (Year: 1991).*

* cited by examiner

COMPUTATIONAL DESIGN OF ROBOTS FROM HIGH-LEVEL TASK SPECIFICATIONS

BACKGROUND

1. Field of the Description

The present description relates, in general, to robotic devices and associated design processes and, more particularly, a system and method for providing computational design of robotic devices, such as legged robots, using a high-level task specified as input.

2. Relevant Background

Over the past five decades, robots have fundamentally transformed industrial manufacturing. More recently, hardware platforms are becoming increasingly versatile and affordable, and robots promise to have an equally profound impact on our daily lives. Indeed, the way we work, learn, and play may forever be changed in the coming years by robotic assistants that help with chores, by robotic therapeutic companions that deliver personalized social and cognitive support, and by robotic playmates that promote educational activities.

Partly due to the need to easily configure customized robotic devices to provide these robots or robotic systems (or devices) and partly due to the economy of mass production, it is common practice to employ a standard set of modular components (e.g., servo motors, mounting brackets, and other structural elements) when creating robotic systems or robots. The task of designing a new robot can amount to choosing which of these modular components to use, determining how to combine them to form a functional system that is sufficiently versatile, and deciding how to control the resulting assembly in order to achieve a new robot that can perform a desirable set of motions or behaviors.

Due to the intimate coupling between these sub-tasks, the design process is notoriously challenging. As a result, most robotic systems available today are the product of meticulous, time-consuming, and largely manual efforts led by experienced engineers or robot designers. As the diversity of robotic devices that enter our lives grows, today's design methodologies are likely to become too limiting or prohibitively expensive if that result has not already been reached.

One example of this design challenge is how best to provide a legged robot to perform a particular task. The diversity of morphologies seen in the animal kingdom has been a source of inspiration for roboticists since the field's very beginnings. Indeed, a wide variety of existing robotic systems aim to closely mimic real-life creatures such as salamanders, cheetahs, kangaroos, chimpanzees, and many other creatures. The process of creating bio-inspired robots is typically guided by observations and measurements coming from real creatures.

However, as with other robots, the process of designing legged robots can be very challenging, and this is due in part to the complex way in which morphological features shape motor capabilities. Current design processes rely on meticulous, time-consuming, and manual design efforts that, as with general robot systems, are led by experienced engineers. Once a design is finished and the robot built, control engineers implement locomotion strategies and attempt to push the hardware to its limits. If the robot's performance is unsatisfactory, the design process needs to be repeated. However, it is unclear how best to change the robot's design from these poor test results to improve performance.

Prior attempts to address these design challenges have emphasized: (a) physical character design; (b) manual robot design; (c) evolutionary robot design; and/or (d) task-based robot design. With regard to physical character design, recent advances in 3D printing technologies have led to a large body of research on design and fabrication of physical characters that satisfy user-provided functionalities. For instance, researchers have proposed automated methods to convert articulated virtual characters into fabricated models with functional joints while others have proposed techniques to make the objects standing or spinning by optimizing mass and inertia distributions. Some have proposed an interactive system to generate stable motions of arbitrary robots such that this work optimizes the motion for the given morphology but fails to address the design challenge of optimizing the morphology for a given motion (which may be described by centroidal and contact dynamics).

With regard to the manual robot design approach, design of robots is a difficult problem that requires prior knowledge on various aspects of robot design including mechanics, electronics, motion planning, and control. In attempting to address the challenging problem, robot designers often have used similar creatures in nature as sources of inspirations. Besides real animals, an animation character has also been used as a source of robot design inspiration, and researchers have designed a morphology and a gait of a bipedal robot that looks and walks like an animation character. Although these design efforts have attempted to optimize the motion trajectories, the design of the robot morphology still remains the territory of experts and experienced engineers.

Evolution-based design approaches, such as the simulated annealing or genetic algorithm, have also been a popular choice to explore discrete robot design spaces so as to try to overcome the difficulty of combinatorial design decisions involved in robot design optimization. Researchers have presented emergence of virtual creatures with various morphologies by mutating and mating genotypes of brains and shapes while others have evolved structures of 2D artificial creatures named "sticky foot," that can pull themselves by varying the amount of friction at end effectors. Particular to robotics, evolution-based design approaches have been applied to various types of robots including manipulators, linkage-based robots, and soft robots under the concept of evolving bodies and brains. Although evolutionary computing has proven to be a simple and effective tool to explore various morphologies of robots, it can easily fall into local minima and there is no guarantee that an optimal design will ever be reached or achieved with this design approach.

The task-based design approach for robots is a paradigm to optimize the design of robots to achieve the best performances for the given tasks. This paradigm has received considerable attention in the field of manipulator design (e.g., general manipulators, parallel manipulators, and the like) to optimize morphologies to try to reach the desired workspaces and avoid joint singularities. The task-based design approach has also been used by researchers to design non-manipulator robots such as pipe-cleaning robots, stair-climbing mobile robots, and legged robots. To date, though, most works related to task-based robot design have focused on optimization of continuous parameters such as limb lengths and have failed to optimize structures of robots including the number of joints and the types of joints.

SUMMARY

To address these and other challenges related to robot design, a system and associated method of robot design, which is particularly well-suited for legged robots (i.e., monopods, bipeds, quadrupeds, and other legged robots), is described that makes use of a first software module that implements a motion optimization algorithm, a second software module that provides morphology optimization, and a third software module that provides link length optimization. Briefly, the motion optimization algorithm outputs motion trajectories of the robot's center of mass (COM) and force effectors. The morphology optimization algorithm uses as input the optimized motion trajectories and a library of modular robot components and outputs an optimized robot morphology (e.g., a parameterized mechanical design in which the number of links per leg and other parameters are optimized). The third software module takes this as input and outputs optimal link lengths for a particular task. In this manner, the design of a robot is made more efficient and is, in large part, automated.

In some implementations, the new system and method for robot design solves (or at least addresses) the problem of automatically designing legged robots for given locomotion tasks by numerical optimization. An example of such a task is to move from one location to another using a specific sequence of footsteps. The parameters optimized in the system and its implemented algorithms (or software modules) may be the length of each link (e.g., a robot leg's thigh, shank, and foot). The cost function for optimization can be chosen to be the sum of squared joint torque, power, and/or contact force which leads to a robot design that is more efficient in terms of energy consumption. The system and its algorithms are believed to provide the first robot design methodology that can optimize the design of legged robots. The optimization algorithms/methods address the issue specific to legged robots of contact and momentum planning. Because handling this issue simultaneously with design optimization makes the problem intractable, a three-stage (or at least two-stage) solution was chosen by the inventors for implementation in the robot design system/framework.

The design system or framework optimizes design parameters in three stages (i.e., motion optimization stage, morphology optimization stage, and link length optimization stage). The input to the system may include a rough design of a robot (e.g., an approximate body size and how many legs the robot has and how many rigid links are in each leg). Further, the user-specified task for the system may be defined by specifying a foot contact pattern (e.g., trot for quadruped robots) and the initial and final positions of the robot's COM (e.g., input may define the motion trajectory for the robot's COM).

In the motion optimization stage, the system or framework optimizes the motion of the simplified model, which is called "the high-level motion" herein, to minimize contact forces. The high-level motion includes the COM trajectory, momentum trajectory, contact positions, and contact forces. In the morphology optimization stage the number of joints per limb and joint axis directions are optimized by searching in the discrete space of possible robot designs. This stage/module also acts, in some embodiments, to choose the best link lengths from a set of discrete values, which are further refined in the link length optimization stage/module. The number of joints and their axes, which can be given in advance when this second stage is omitted from the system/framework design, is provided as part of the optimized parameters output by the system/framework such that the robot design system with three stages requires much less manual work for robot design. One difficulty identified by the inventors is that the search space complexity grows exponentially with respect to the number of available design choices, and this issue is addressed by use of an efficient search algorithm with a novel heuristic function that estimates the total design cost. In the link length optimization stage, the system or framework optimizes leg link lengths and the associated full-body motions to achieve the given task while, in some implementations, minimizing torque consumption. This stage may also optimize other link parameters such as the distance between hip joints in the body. In some cases, the cost function can vary substantially with the design parameters, which indicates it is useful to provide careful fine tuning of a robot's morphological features. The usefulness of the design system/framework has been verified by the inventors at least on various robots/robotic designs including manipulators, a robot kit, and a quadruped robot.

The design of legged robots has often been inspired by animals evolved to excel at different tasks. However, while mimicking morphological features seen in nature can be very powerful, the inventors recognized that robots often need to perform motor tasks that their living counterparts do not have to perform. Furthermore, robots typically have different physical properties from their living counterparts due to available actuators and materials. With such robots, simply imitating animal body structure and dimensions may not result in the best performance. In the absence of designs that can be mimicked, the alternative design approach has been to resort to mathematical models that allow the relationship between a robot's form and function to be explored. In contrast, the robot design systems (and corresponding methods) taught herein use a model to co-design the motion and leg configurations of a robot such that a measure of performance is optimized.

The system (and its underlying design framework) begins by planning trajectories for a simplified model that includes the center of mass (COM) and feet of the robot. The system then functions to optimize the length of each leg link while solving for associated full-body motions. The model was successfully used to find optimized designs for legged robots performing tasks that include jumping, walking, and climbing up a step. The findings obtained thus far indicate that the cost function (e.g., the sum of squared joint torques over the duration of a task) varies substantially as the design parameters change.

The system (and associated method) provides an approach to automatic design of robotic devices from high-level task specification provided by a user. Prior to the optimization of link length, the robot design (or computational) system may use a morphology optimization stage or module that uses a library of modular components (off the shelf library and/or components and/or user-defined set of components (e.g., a subset of the off-the-shelf components, user-designed/manufactured components, and the like)), which may include actuators, mounting brackets, and connectors, to define the space of possible robot designs to perform a particular task (which can be defined as motion trajectories of the COM and/or force effectors provided as output of the motion optimization stage/module). For example, the process of creating a new robot can begin with a set of input trajectories that specify how its end effectors or COM should move. By searching through the combinatorial set of possible arrangements of components in the library of modular components, the method generates a functional, as-simple-as-possible robotic device that is capable of tracking the input motion trajectories.

To significantly improve the efficiency of this discrete optimization process, the inventors discovered and used a heuristic that guides the search for appropriate designs. Briefly, the heuristic function used in the robot design system estimates how much an intermediate robot design needs to change (or preferably should change) before it becomes able to execute the target motion trajectories. The effectiveness of this computational design system and method is demonstrated by automatically creating a variety of robotic manipulators as well as wheeled and legged robots. To this end, the inventors employed both an existing library of modular robotic components as well as kits of the inventors' own design that included off-the-shelf actuators and 3D printable connectors (e.g., a user-defined library of modular robotic components). The results were validated by fabricating and operating four of the robotic devices designed using the system (and methods) described herein to perform the user-specified high-level task (used as input to the motion optimization module/stage).

More particularly, a system is provided that is specially adapted for automating design of a robot. The system (e.g., a special-purpose computer) includes a motion optimization module processing a rough design of a robot that includes a number of limbs for the robot and further processing a user-specified task for the robot to generate an optimized high-level motion for the robot to perform the user-specified task. The system also includes a link length optimization module processing the optimized motion to generate a set of link lengths for each of the limbs of the robot. Generally, the user-specified task includes a location of a center of mass (COM) of the robot, and the optimized high-level motion includes a trajectory of the COM of the robot while performing the user-specified task. Further, the user-specified task typically includes contact positions for the robot, and the optimized high-level motion is generated to minimize contact forces for the robot while performing the user-specified task based on the contact positions. In the same or other embodiments, the rough design of the robot describes centroidal dynamics and contact behaviors of the robot.

In some implementations of the system, the set of link lengths are determined by the link length optimization module as optimal lengths of links in each of the limbs of the robot that minimize a sum of joint torques for the user-specified task. In such implementations, the link length optimization module may also solve joint positions, joint velocities, joint acceleration, fullbody contact forces, and joint torques.

In some embodiments, the system also includes a morphology optimization module that operates to process as input: (a) the rough design of the robot; (b) the optimized high-level motion; and (c) a library of modular components for fabricating the robot to generate an optimized morphology for processing by the morphology optimization module. The optimized morphology defines a number and type of link for each of the limbs, a location and orientation for each joint in each of the limbs, and a number and location of servos for performing the user-specified task. Also, in some cases, the optimized morphology is generated with an algorithm configured to solve a shortest path finding problem in a directed graph with nodes in the directed graph each corresponding to a different design of the robot. Particularly, in some exemplary configurations, the algorithm is adapted as a best-first search algorithm including a heuristic function, and, in some preferred embodiments, the heuristic function is a tip-based heuristic function.

DETAILED DESCRIPTION OF THE PREFERRED EMBODIMENTS

Figure 1:
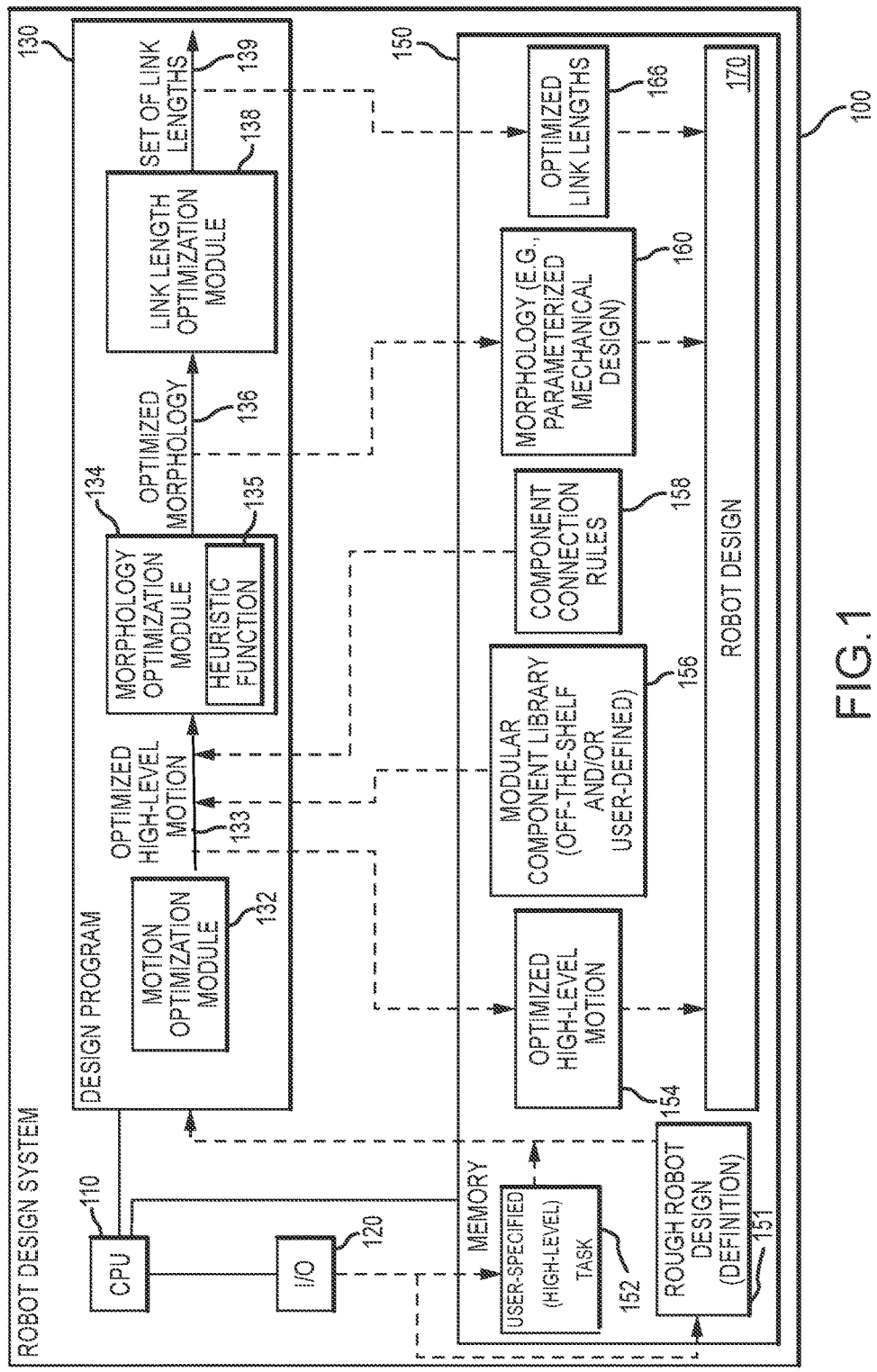
FIG. 1 is a functional block diagram of a robot design system (or special purpose computer configured to provide computational design of robotic devices from high-level task specified by the user) of the present description.

Briefly, a system for automated robot design (and associated method of robot design), which is particularly well-suited for legged robots (i.e., monopods, bipeds, quadrupeds, and other legged robots), is described herein. The system is implemented on a computer(s) so as to provide computational design of robots or to provide computational design of robotic devices from high-level task specifications provided by a user. The system makes use of a first software module that implements a motion optimization algorithm, a second software module that provides morphology optimization, and a third software module that provides link length optimization. Briefly, the motion optimization algorithm outputs motion trajectories of the robot's center of mass (COM) and force effectors. The morphology optimization algorithm uses as input the optimized motion trajectories and a library of modular robot components and outputs an optimized robot morphology (e.g., a parameterized mechanical design in which the number of links in each of the legs and other parameters are optimized). The third software module takes this as input and outputs optimal link lengths for a particular task. In this manner, the design of a robot is made more efficient and is, in large part, automated.

To address some of the problems with prior robot design approaches, one goal of the inventors in creating the new robot design system was to develop models that concurrently reason about a robot's morphology and control policies. The locomotion tasks that were considered are described by trajectories for a robot's center of mass (COM) and its feet. These motion plans are computed using trajectory optimization, they are independent of morphological features (e.g., limb configuration), and they are treated as constraints that the robot's motions must satisfy.

In the robot design system, an optimization-based approach is used to co-design the limb configuration (lengths of limb segments) and the motions of a legged robot such that joint torques are minimized. Performing the optimization process for different tasks (high-level task specifications input into the motion optimization algorithm such as walking versus bounding versus stair climbing) results in robot designs that are quite different from each other. From the inventors' research and robot design system, it appears that significant gains in performance can be expected if a robot's morphological features are appropriately designed.

With this in mind, the design system (or its program(s)) includes the morphology optimization module that provides a novel computational method that efficiently automates the challenging problem of designing robotic devices. The computational system (or the morphology optimization module) takes as input a library of modular components as well as basic rules that define compatible connections between these modular components. Starting from a user-specified high-level specification of a task, which may be optimized by the motion optimization module and which may be provided in the form of desired trajectories for end effectors and/or the robot's COM, the morphology optimization module creates a functional, as-simple-as-possible design. The output designs are obtained by searching through the space of possible arrangements of modular components. To guide this discrete optimization process, a heuristic cost function is used by the module to estimate the ability of any intermediate design to reproduce the input motion trajectories.

FIG. 1 illustrates a robot design system 100 of the present description, which may be implemented using one or more computers or computing devices configured as special-purpose devices to provide computational design of robotic devices from a user-specified task. The system 100 includes a processor(s) 110 that manage operations of memory/data storage devices 150 (e.g., computer readable media on the system 100 or accessible in a wired or wireless manager by the processor(s) 110) and also input/output (I/O) devices 120. The processor(s) 110 also executes code or software to implement the functionality of a design program 130 (e.g., to provide the design method/functions described herein).

The I/O devices 120 may include a keyboard, a touchscreen, a monitor, a mouse, voice recognition software, and/or a graphical user interface (GUI) that may be generated by the design program 130 or other programs, and the I/O devices 120 are used by an operator of the system 100 to initiate the design program 130 to begin the robot design process. Further, the I/O devices 120 are used by the operator or user of the system 100 to input a rough or general robot design 151 and a user-specified task 152 as shown stored in memory 150 by the processor 110 and passed to the design program 130 as input (e.g., as input to the motion optimization module 132 as discussed below). The rough design 151 may provide the number of legs a legged robot has and a user's initial selection of the number of rigid links in each of the legs (which may be later modified by morphology optimization module 132), and define a shape envelope for the robot to be designed by the design program 130 (e.g., to define a general size and shape for the robot and its legs). The initial definition 151 may also provide the center of mass (COM) of the robot and the COM position.

The design of a robot is performed in three sequential stages with system 100. In this regard, the design program 130 includes a motion optimization module 132, a morphology optimization module 134 (with a heuristic function/algorithm or submodule 135), and a link length optimization module 138. The motion optimization module 132 takes as input the rough robot design definition 151 and the user-specified task 152 for the robot being designed by the design program 130, and this module 132 processes this input to generate a high-level motion 133 with optimized trajectories (e.g., for the robot's COM and/or for the robot's force effectors). The output 133 of the motion optimization module 132 is stored in memory 150, and it is used to provide a first set of parameters defining the new robot being designed (and are stored in memory 150 as shown at 170).

The output 133 of the motion optimization module 132 is also provided as input to the morphology optimization module 134. The module 134 also takes as input a modular component library 156 and a set of rules for connecting these components 158. The modular component library 156 may be a library of off-the-shelf robotic components (e.g., generated or selected based on user input via I/O devices 120) and/or may be a library wholly or partially defined by the user (e.g., components designed or at least selected from available components by a user of the system via input from I/O devices 120). The morphology optimization module 134 processes these inputs 133, 156, and 158 such as with its heuristic function or algorithm 135 to produce output in the form of an optimized morphology 136, which may take the form of a parameterized mechanical design that is stored in memory 150 as shown at 160 and which provides a second set of parameters (design parameters) for the new robot (again, stored at 170 as part of the robot design). The parameterized mechanical design or morphology 136, 160 may define an optimal number of links in each of the legs for the robot as well as the type and number of the modular components from the library 156 such as joint types, actuators/motors, and the like. The morphology 136, 160 may provide a joint and other component location and/or orientation in 3D.

The optimized morphology 136 is provided along with the optimized trajectory (or trajectories) 133 as input to the link length optimization module 138. This module 138 acts to process these inputs 133, 136 to generate a set of optimized link lengths 139 for the links identified by the morphology optimization module 134 for performing the task 133. This set of optimized link lengths are stored in memory 150 by the processor 110, and provide a third set of design parameters for defining the robot design 170 for the new robot.

Figure 2:
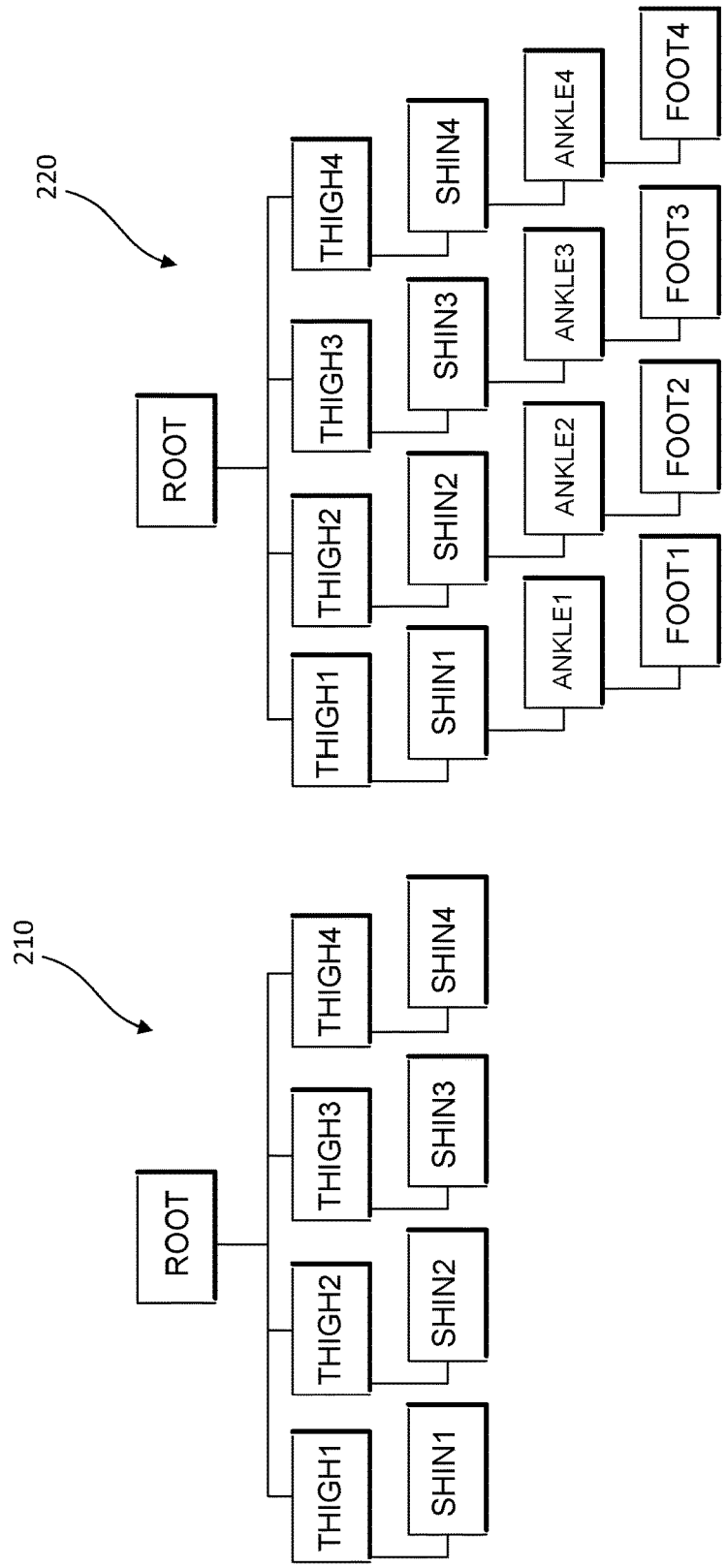
FIG. 2 illustrates graphically two exemplary input structure of quadruped robots.

One goal in providing the new robot design system is the development of mathematical models that can automatically design morphological features for legged robots such that these robots can efficiently perform specific locomotion-based tasks. As discussed with reference to FIG. 1, the input to the design program (and its motion optimization module) is a rough description of a desired robot design along with a high-level definition of the task to be performed by the robot. For example, the rough robot description may indicate how many legs the robot should have and how many rigid links are desired (but this often is modified by the morphology optimization module). FIG. 2 illustrates the input structure for the design program of quadrupeds with two-link legs with graph 210 and with three-link legs with graph 220.

Figure 3:
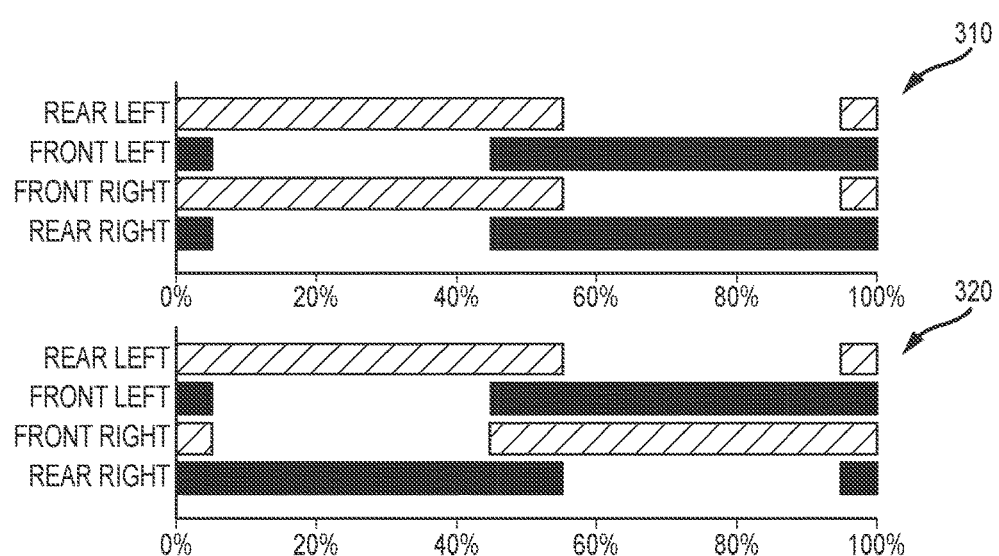
FIG. 3 illustrates input gait graphs of trotting and bounding gaits to define a task for a robot.
Figure 4:
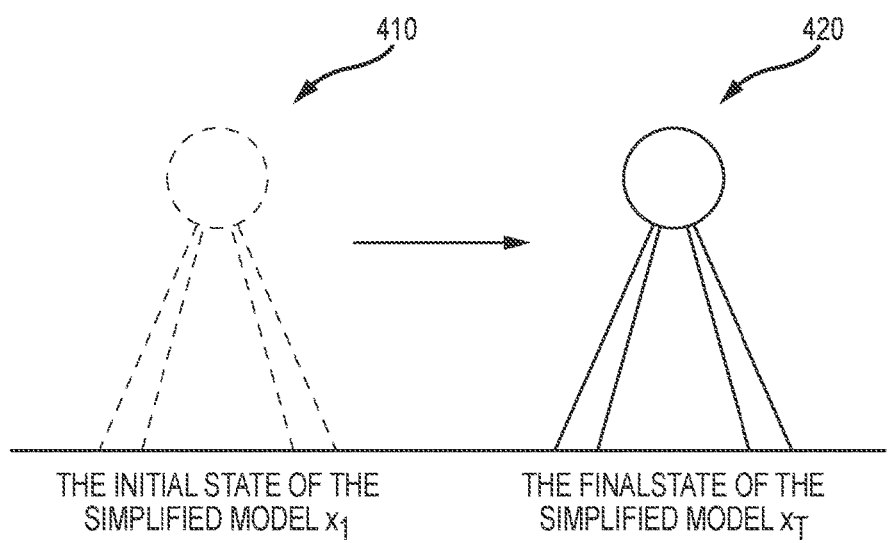
FIG. 4 illustrates in simplified form the models of used to provide the initial and final states of the robot being designed including the COM positions, orientations, and contact positions.

With regard to defining the task, FIG. 3 illustrates that the task may be defined by user input providing a footfall pattern Graph 310 is an input gait graph of trotting (a particular locomotion-based task) while graph 320 is an input gait graph of bounding (a different locomotion-based task for a legged robot). In graphs 310 and 320, the X-axis represents one gait cycle and the solid bars represent footfall patterns. Further, the user-specified task may be defined by providing the initial and final states of the desired robot's COM. FIG. 4 illustrates with simplistic graphics an initial state of the model, $x_1$, at 410 and a final state of the model, $x_T$, at 420. The COM positions $p^C$, orientations $r^C$, and contact positions $P^i$ are also provided in the description of the input task (or in the models shown in FIG. 4). The example in FIG. 4 describes or defines the walking task (or locomotion-based task of walking) for quadrupeds (e.g., for two or three-link legged quadrupeds).

For the given user inputs, the design program optimizes design parameters that are required to fully define the shape of the robot, such as the lengths of the limbs and the links. The design program does not explicitly optimize mass distribution because it was designed using the assumption that the weights of servos cannot be freely adjusted. Instead, the design program treats masses as dependent variables of link lengths by assigning heavier weights for longer links. The design program (or design system/framework) is configured to optimize design parameters in stages (e.g., typically two or three stages) including: (a) a motion optimization stage; (b) a morphology optimization stage; and (c) a link length optimization stage. In the motion optimization stage, the design program optimizes the motion of the simplified model to minimize contact forces, which is called or labeled the high-level motion. The high-level motion includes the center of mass trajectory, momentum trajectory, contact positions, and contact forces. In the link length optimization stage, the design program optimizes leg link lengths and the associated full-body motions to achieve the given task while minimizing torque consumption. This stage may also optimize other link parameters, such as the distance between hip joints on the body. The following discussion fully describes the stages/algorithms used in the design program for both 2D and 3D cases.

Figure 5:
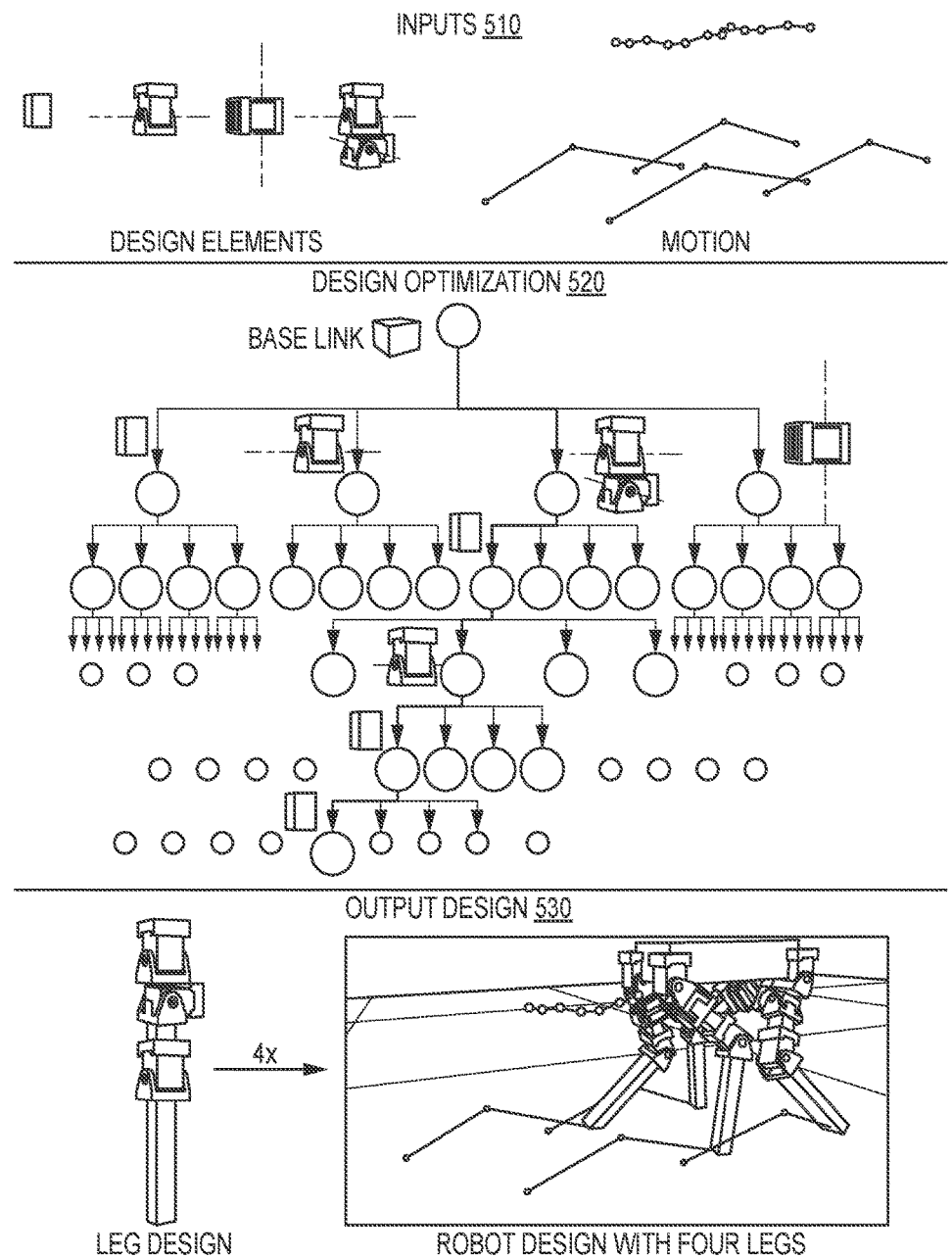
FIG. 5 illustrates a graphical representation of the operations or algorithms implemented by the morphology optimization module of a robot design program of the present description.

With regard to the morphology optimization stage, the design program may implement this with an algorithm to find the simplest design of a robotic device that can execute a given task. FIG. 5 is a graphical overview of the operations of the morphology optimization stage/module of the robot design program. As shown at 510, the input to the stage/module includes design elements (e.g., available set of joints and links) and the motion (e.g., from motion optimization module/stage that may provide COM and end-effector motion trajectories). The morphology is optimized with the morphology optimization process or algorithm 520 shown with an exemplary search tree (which is simplified for illustration purposes). The output design (or optimized morphology for the input trajectory and component library) 530 is shown to provide a leg design with a particular number of links, types and location/orientations of components, and the like, and, for a quadruped or 4-legged robot the four legs (in this example) may be symmetric.

As a further overview of the morphology optimization module, the module (or the algorithm it implements/performs) takes as inputs 510 a set of design elements and a task specification. The design elements or modular component library are the building blocks of robotic devices indicated by the design program user (or as a default set available to the program) as being available for this particular robot design. The design elements may include a base link, various lengths or links, and various types of joints, and the design elements define a design space (e.g., a set of possible designs of robotic devices), which is exponential to the number of links and joints. The user-specified task for the robot is described by high-level specifications such as end effectors and/or COM trajectories (e.g., an input motion). The input motion can be manually prescribed by a designer or obtained by the design program (e.g., by the motion optimization module) by solving a space-time optimization of centroidal dynamics for a given (user input) footfall pattern.

The inventors recognized that the robot design problem they were facing has two unique difficulties that prevent the use of off-the-shelf numerical solvers. First, the design problem inevitably has discrete free variables such as link or joint types. Second, a number of free variables are not fixed because a number of joints per limb is unknown. It results in the huge space of possible robot designs with exponential complexity, which is hard to be solved with naive algorithms.

With these difficulties in mind, the inventors tackle the morphology optimization problem with a heuristic-based search, e.g., A*. The algorithm of the morphology optimization module/stage begins with the initial design that only has a base link, which is assumed to have a computing unit and a battery. For the given design, the algorithm generates a set of child designs by appending various design elements to end effectors, which are likely to be intermediate and, yet, fully functional. The heuristic function estimates how much the child designs need to be changed to execute the given task. Among all the generated designs, the algorithm selects the most promising design and expands its children until it finds the simplest design of a robotic device for the given motion.

The performance of the heuristic-based search may vary with respect to the given heuristic function. Instead of relying on a simple error-based heuristic, the inventors developed a new tip-based heuristic function that considers future degrees of freedom. This heuristic function augments the current intermediate design with a "virtual tip" that has a ball joint and a telescopic rod, which is an idealized future design. The tip-based heuristic function considers the promising design if the augmented design can track the desired motion while not changing lengths of telescopic rods because this implies that the current design already has enough degrees of freedom.

Now, it may be useful to describe each of the stages or modules of the robot design program (e.g., program 130 in FIG. 1) and the algorithms/processed used by each to process the design inputs to provide the optimized outputs that make up a new robot design. Turning first to the motion optimization stage or module, the design program optimizes the motion of the simplified robot model for executing the user-specified task. In some implementations, the simplified model of the robot is defined as a single rigid body with variable-length legs that describes centroidal dynamics and contact behaviors (e.g., see FIG. 4).

Turning to one useful motion optimization module, we can let T be a number of frames and N be a number of legs. At each discretized frame t ($1 \leq t \leq T$), the state $x_t = [p_t^C, r_t^C, p_t^1, \ldots, p_t^N, f_t^1, \ldots, f_t^N]$ is described by a center of mass position $p^C$, orientation $r^C$, contact position $p^i$, and contact forces $f^i$ where i ($1 \leq i \leq N$) is a leg index. The user defines the task with the initial state $x_1$, the final state $x_T$, and the gait graph $G = \{c_t^i\} \forall t \leq T, i \leq N$. The contact variable $c_t^i$ is 1 when the ith leg is in contact at the frame t and 0 otherwise. The free variables of the optimization x are the states between the initial and final states, $x = [x_2, \ldots, x_{T-1}]$. The objective of the optimization $f_{design}$ is to minimize a weighted sum of velocity, acceleration, and contact forces for all frames.

$$f_{design}(x) = \Sigma_t(w_v|[\dot{p}_t^C, \dot{r}_t^C]|^2 + w_a|[\ddot{p}_t^C, \ddot{r}_t^C]|^2 + w_f\Sigma_i|f_t^i|^2) \quad \text{Eq. (1)}$$

where $w_v$, $w_a$, $w_f$ are the weights for the velocity, acceleration, and contact force terms, which are set as 100.0, 0.01, and 0.0001 for all the experiments run by the inventors. Note that the weights for acceleration and force terms are much smaller than the weight for the velocity term to normalize physical quantities in different units. Derivatives and second derivatives are calculated using second order finite differences.

While minimizing the given objective function, the motion is constrained by the laws of physics:

$$m\ddot{p}_t^C = \sum_{i=1}^{N} f_t^i \quad \text{Eq. 2}$$

$$I\dot{r}_t^C = \sum_{i=1}^{N}((p_t^i - p_t^C) \times f_t^i)$$

$$c_t^i z(p_t^i) = 0 \quad \forall\, i \in N$$

$$(1 - c_t^i)|f_t^i| = 0 \quad \forall\, i \leq N$$

$$c_t^i \dot{p}_t^i = 0 \quad \forall\, i \leq N$$

$$f_t^i \in \mathcal{F}_\mu \quad \forall\, i \leq N$$

$$|p_t^C - p_t^i| \leq l_{max} \quad \forall\, i \leq N$$

where m and I are the mass and inertia of a robot and are provided as user inputs and where $l_{max}$ (=0.8 m) is the maximum effective limb length (the distance from the hip to the toes), which is shorter than the maximum cumulative limb length (the sum of all limb link lengths). The function z(p) extracts the vertical z component of the given position while $\mathcal{F}_\mu$ indicates the friction cone. The constant friction parameter $\mu$=1.0 was used by the inventors for all the test cases or experiments.

From the top of Eq. 2, constraints enforce the conservation of linear and angular momentum, ensure that contacts occur at the ground, allow no external forces without contact, allow no foot slipping during contact, and enforce friction cones and maximum leg lengths. Constraints are implemented as soft constraints using the penalty method. The formulated motion optimization problem in this stage may then be solved such as with Sequential Quadratic Programming (SQP) to provide motions (e.g., optimized trajectories) of all the key parts of the robot that is being designed/modeled.

It may now be useful to turn the discussion to the morphology optimization module or stage of the robot design program/algorithm(s), which receives the output of the motion optimization module as input. First, with regard to the design of a robotic device and its design space, a robotic device can be thought of as a hierarchical structure including links and joints, which are actuated such as by electronic servos. It may be useful to assume that the target robotic device (as defined in part by the rough robot design definition input by the user of the robot design system to be a manipulator or legged robot) has a tree structure without any internal cycle. To explore various robotic devices, it is useful to first define a design $\mathcal{D}$. Under the assumption of the tree structure, a design can be recursively defined as a description of a root element and designs of subtrees. Therefore, a design $\mathcal{D}$ is a tree T(V,ε) where a vertex v∈V describes a link and an edge e∈ε describes a joint between two links. The size of the design space of possible robotic devices is exponential to the space of individual design elements.

Because the design can be defined recursively, a design of a robotic device can be constructed in an additive way. Starting from a base link, which is a simple module with a power source and a computing unit (for example), links and joints can be repeatedly appended to the end effectors. Links and joints can be selected from a set of design elements (e.g., a library of modular components defined by a user or by a robotic kit or the like). The morphology optimization space 520 in the graph of FIG. 5 shows an example design space of a simple manipulator that alters the parent design by adding a child link with various lengths and various types of joints.

Note that a design of a robotic device may be benefited by decision on both combinatorial and continuous features. For instance, combinatorial features may include servo models, joint types, and a number of links in the limbs while continuous features may include link dimensions, link masses, and joint offsets. However, a large number of commercial modular robotic kits, such as Lego Mindstorms™, MOSS™, and the like, provide only combinatorial choices, e.g., selecting building blocks or assembling them at discrete positions, and do not have any continuous design parameters. To provide a unified framework for all robotic kits, the inventors discretize all continuous parameters and convert a design space into a structured set of discrete variables.

With regard to motion optimization, a robotic device is useful only when it is able to execute user-provided tasks. Therefore, the design $\mathcal{D}$ is preferably validated by solving the associated motion for the given task. The motion may be defined or provided as input to the morphology optimization module from the motion optimization module in many implementations of the present design program. In these or other implementations, the motion may be defined as a sequence of poses Q={$q_1$, . . . $q_N$} for N frames. For each frame i≤N, the pose $q_i$ is solved that achieves the user-defined task. The task can be described by a user-provided objective $E_j$ and constraints $C_k$, where j and k are indices. Examples of objective terms, as discussed above with regard to the motion optimization module, are to track desired end-effector trajectories or to track desired COM trajectories. An example of constraints is to avoid collisions between the device and obstacles. The list of objectives and constraints that may be useful in implementing the robot design program and/or the morphology optimization module are listed below in Table 1.

TABLE 1

Motion Objectives and Constraints

| Description | Expression |
| --- | --- |
| End-effector tracking objective | $E_{pos} = {}^a|EE(q) - \hat{p}|^2$ |
| COM tracking objective | $E_{com} = {}^b|C(q) - \hat{C}|^2$ |
| Collision constraint | $C_{col} = {}^c|c(q) - \hat{c}|^2 - {}^d\hat{d}$ |
| Link above-ground constraint | $C_{above} = {}^eL(q) \cdot [0, 1, 0]^T$ |

${}^a$EE$_i$(q) and $\hat{p}_i$ evaluate the actual and desired end-effector position.
${}^b$C(q) and $\hat{C}$(q) evaluate the actual and desired COM positions.
${}^c$c(q) and $\hat{c}$ evaluate the positions of the collision shapes in the robot and objects.
${}^d\hat{d}$ is the minimal distance between two collision shapes.
${}^e$L(q) evaluates the COM position of the link.

For each time frame i, the optimization is solved to find the pose $q_i$:

$$q_i = \underset{q}{\operatorname{argmin}} \sum_{j=1}^{M} w_j E_j(\mathcal{D}, q, i) \qquad \text{Eq. (3)}$$

$$\text{s.t. } C_k(\mathcal{D}, q, i) \leq 0 \ \forall k$$

where $w_j$ is the weights of the objective terms. The quality of the motion Q for the given design $\mathcal{D}$ is evaluated as a sum of objective functions:

$$e(\mathcal{D}, Q) = \Sigma_i^N \Sigma_j w_j E_j(\mathcal{D}, q_i, i) \qquad \text{Eq. (4)}$$

Joint angle limits may be set at ±150°. The joint velocities may not be explicitly minimized, but, instead, additional joint limits can be set at ±75° from the previous time frame, which corresponds to maximum 300°/s with the 0.25 time step. The formulated problem can then be solved by Sequential Quadratic Programming (SQP). Because the motion optimization can fall into local minima, the motion may be solved three times (or some other number of times) with different initial guesses and the best solution chosen.

One design objective of the morphology optimization module or stage was chosen by the inventors to be to find the simplest design that can execute the user-specified task. The design cost function g quantifies the simplicity of the given design $\mathcal{D}$:

$$g(\mathcal{D}) = w_l g_l(\mathcal{D}) + w_n g_n(\mathcal{D}) \qquad \text{Eq. (5)}$$

where $g_l$ measures the length of the design and $g_n$ measures the number of actuated joints. Therefore, the optimal design $\mathcal{D}^*$ and its motion Q is defined as follows:

$$\mathcal{D}^*, Q^* = \underset{\mathcal{D}, Q}{\operatorname{argmin}} g(\mathcal{D}) \qquad \text{Eq. (6)}$$

$$\text{s.t. } e(\mathcal{D}, Q) \leq \epsilon$$

where $\epsilon$ defines the maximum allowed motion error of the design.

At this point in the description, it may be useful to describe in detail the algorithm used to implement the morphology optimization module (e.g., the module 134 in FIG. 1). The inventors recognized that the off-the-shelf numerical solvers are not suited to or cannot be applied to the formulated morphology optimization problem (Eq. (6)) due to the discrete free variable $\mathcal{D}$. Therefore, a new efficient algorithm was developed by the inventors to explore the discrete design space, whose size is exponential to the number of available design elements (number of components in the modular component library or robotic design kit).

One key insight made by the inventors is that the morphology optimization can be formulated as a shortest path finding problem in the directed graph. In this formulation, a node in the graph corresponds to a design of a device. An initial node is an empty design with only a base link. Goal nodes are provided as a set of designs that can execute the user-specified task with a motion error (given by Eq. (4)) smaller than a threshold $\epsilon$. A directed edge from the design mode $\mathcal{D}_1$ to the design node $\mathcal{D}_2$ is created if and only if the first design $\mathcal{D}_1$ can be changed to the second design $\mathcal{D}_2$ with a single operation, such as adding additional links or joints to the end effectors. The cost of the edge is set to an additional design cost $g(\mathcal{D}_2) - g(\mathcal{D}_1)$. Therefore, a length of the path from the initial node to the goal node is equal to the total design cost, which can be solved by existing path finding algorithms.

The most naive approach to optimizing the morphology would be to include a brute-force search such as a Breadth-first search (BFS) algorithm in the morphology optimization module. This algorithm starts from the initial node and explores the immediate neighbors of explored nodes. Although the implementation of the algorithm is simple, the execution may take very long for difficult design problems due to the exponential complexity of the search space. In addition, the search sequence remains the same for all design problems because the algorithm does not consider any costs of nodes or future cost estimations.

An alternative method would be to implement a randomized search in the morphology optimization module/stage that explores adjacent nodes in a random order. For example, the randomized search may be a pure random walk variant or a simulated annealing variant that conditionally accepts the transition based on the costs of the current and previous nodes. Unlike the BFS algorithm, this algorithm can explore complex designs with large design costs and can find a feasible design that can execute user-provided tasks in a more reasonable time period. In some cases, though, this algorithm may not be wholly satisfactory as it can fall into local minima and can fail, in some cases, to find the most compact design.

In some preferred embodiments, the inventors use the A*, which is a popular algorithm for finding a shortest path between nodes. The A* is a best-first search algorithm that expands the best node that has the shortest estimated total travel distance. In the presently discussed domain, A* expands the design that minimizes the following function:

$$f(\mathcal{D}) = g(\mathcal{D}) + h(\mathcal{D}) \qquad \text{Eq. (7)}$$

where g is the previously defined design cost function (Eq. (5)), and h is a heuristic function that estimates a future design cost to achieve the target task, which is defined in detail below.

One preferable property of the heuristic function is admissibility, which indicates that the heuristic function never overestimates the actual cost-to-go value. When the heuristic function is admissible, it is proven: (1) A* search always finds the optimal path if one exists and (2) the first searched path is the optimal path. However, when the heuristic function is too optimistic, such as $h(\mathcal{D}) = 0$ for all nodes, A* becomes the Dijkstra search and does not efficiently navigate nodes. Therefore, the inventors recognized that it is important to try to design an accurate heuristic function h for an efficient A* search.

The heuristic function for inclusion in the morphology optimization module may be labeled an error-based heuristic. Particularly, one possible heuristic is to use the largest distance from the end effector to the target trajectory:

$$h_{err}(\mathcal{D}) = \underset{q_i}{\max} w_{pos} E_{pos}(\mathcal{D}, q) \qquad \text{Eq. (8)}$$

where the values of $E_{pos}$ are from the motion optimization (e.g., from the motion optimization module and/or from Eq. (4)). By setting $w_{pos}$ to be the same as $w_l$, this heuristic measures the future additional required lengths to the end effectors, while ignoring the cost of additional required joints. Therefore, the heuristic $h_{err}$ is theoretically admissible. In practice in some cases, it may not be admissible due to the error tolerance $\epsilon$.

Figure 8:
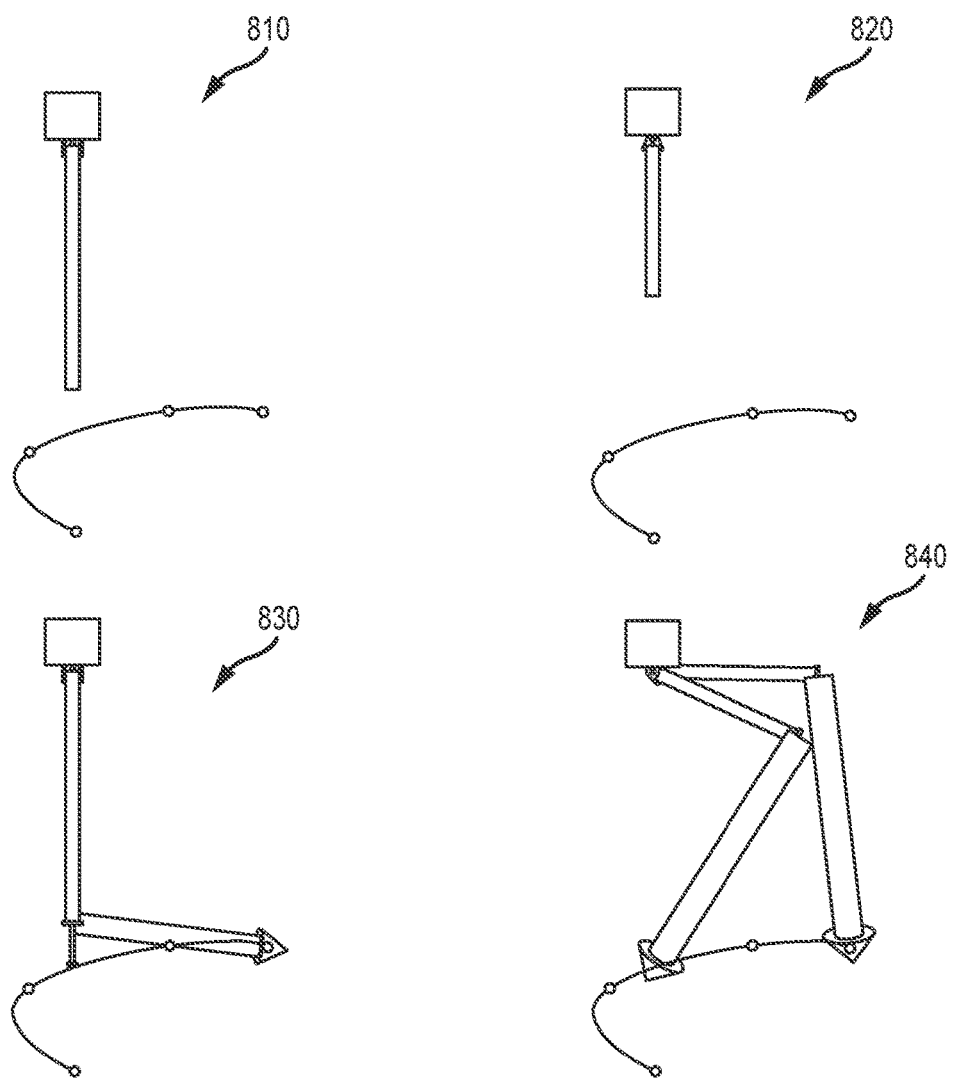
FIG. 8 is a set of four schematic diagrams providing a comparison of error-based and tip-based heuristics for two robot designs.

It should be noted, though, that $h_{err}$ does not tightly estimate the future design costs. It tends to focus on a single frame when the target trajectory is farthest and ignores the motions in the rest of the frames. Moreover, it may not fully consider the current degrees of freedom. FIG. 8 illustrates a comparison of use of the error-based heuristic with the use of a tip-based heuristic for two robot designs. Schematic 810 and schematic 820 of FIG. 8 show two designs: a robot arm with a Y-axis hinge joint and a robot arm with a Z-axis hinge joint. For these designs, $h_{err}$ provides a lower value for the design with the Y-axis hinge joint than the one with the Z-axis hinge joint because its end effector is closer to the trajectory. However, the design with the Z-axis hinge joint shown in schematic 820 will be closer to the optimal because it can be made optimal by adding an additional link with another Z-axis hinge joint.

With these limitations of the error-based heuristic understood, the heuristic function for inclusion in the morphology optimization module may instead be a tip-based heuristic. This is a new heuristic function developed by the inventors that is useful for providing faster searching that estimates for future design costs based on the difference between the current motion and the target trajectory. One insight discovered and provided by the inventors is that the future design cost is likely to be low if the current design can track the fixed distance to the target trajectory, which is true because it implies that the current design already has sufficient degrees of freedom.

With regard to formulation of the tip-based heuristic, it may be desirable to quantify the ability of the design to track the fixed distance. To this end, the augmented design $\tilde{\mathcal{D}}$ can be created by adding virtual tips to the end effectors of the current concrete design $\mathcal{D}$ (see FIG. 8), which is served as an idealized expectation of future design. The virtual tip can be provided as a telescopic rod with a ball joint, which can always reach any position in the workspace. If the augmented design can reach the point while maintaining its length, this implies that the current design for the robot's morphology is promising. Therefore, the tip-based heuristic function can be stated as:

$$h_{tip}(\mathcal{D}) = \min_{\tilde{Q}} \sum_{i}^{N} \sum_{j \in J_t} \left( w_t * |q_j^i|^2 + w_c |\dot{q}_j^i|^2 \right) \quad \text{Eq. (9)}$$

$$\text{s.t. } e(\tilde{\mathcal{D}}, \tilde{Q}) = 0.0$$

where $\tilde{Q}$ is the motion of the augmented design $\tilde{\mathcal{D}}$ and where $J_t$ is a set of telescopic degrees of freedom indices at the tips. Further, $|q_j^i|$ measures the lengths of tips, and $|\dot{q}_j^i|$ measures the changes of tips, while scaled by $w_t$ and $w_c$. The size of the telescopic joint set $J_t$ is equal to the number of end effectors in the robot design. Note that this heuristic function is no longer admissible due to the velocity term. Instead, it generates more tight estimations of the cost-to-go value, which usually converges faster but without guarantee.

Turning again to FIG. 8, schematic diagrams 830 and 840 show the augmented designs with tips. In the designs shown in diagrams 810 and 820, the error-based heuristic $h_{err}$ prefers the left design (see diagram 810) due to shorter distances to the target trajectory. However, in the diagrams 830 and 840, it can be seen that the tip-based heuristic $h_{tip}$ prefers the one shown in diagram 840 because it can track the target without changing the tip length. In other words, the design shown in diagram 830 (Y-axis hinge joint) needs to change the length of the tip because it does not have enough degrees of freedom. On the other hand, the design shown in diagram 840 (Z-axis hinge joint) can track the target trajectory while maintaining the tip rigid. Therefore, the tip-based heuristic $h_{tip}$ prefers the Z-axis hinge joint design, with a sufficiently large $w_c$.

With regard to implementation and practical computation, the above-described optimization is a difficult and highly constrained problem because the entire motion has to be solved at once due to the velocity term $\dot{q}^i$, which is not preferable in practice. For efficient solving, the desired rigid tip lengths, $\bar{q}_j^{len}$ can be guessed or estimated. Then, the poses at frames can be decoupled by substituting the velocity term $|\dot{q}_j^i|$ with the difference to the desired rigid tip lengths $|q_j^i - \bar{q}_j^{len}|$ at the joint $j \in J_t$:

$$\tilde{h}_{tip}^i(\mathcal{D}, \bar{q}^{len}, i) = \min_{\tilde{q}_i} \sum_{j \in J_t} \left( w_t * |q_j^i|^2 + w_c |q_j^i - \bar{q}_j^{len}|^2 \right) \quad \text{Eq. (10)}$$

$$\text{s.t. } e_f(\tilde{D}, \tilde{q}_i, i) = 0.0$$

$$\tilde{h}_{tip}(\mathcal{D}) = \min_{\bar{q}^{len}} \sum_{i}^{N} \tilde{h}_{tip}^i(\mathcal{D}, \bar{q}^{len}, i)$$

This formulation can be solved with a two-loop optimization as shown below in Algorithm 1. In the outer loop, the guess of desired tip lengths is searched. The search starts from the zero desired tip lengths, which indicates no tips, and update the desired tip length by the maximum tip lengths in the current motion, $\max q_j^i$. In the inner loop, Eq. (10) is solved to evaluate the quality of the current desired tip lengths. The number of outer loops was limited to two for all experiments because computation of each outer loop is costly and the result value converges, in practice, after two iterations.

---
Algorithm 1 - A Tip-based Heuristic Function
---
Require: the design $\mathcal{D}$
1: the desired length $\bar{q}^{len} = [0, ...,0]$
2: the best heuristic value $\bar{v} = \infty$
3: while not converge do
4:  for all frame i do
5:   solve the pose $\tilde{q}_i$ by minimizing $\tilde{h}_{tip}^i$
6:  end for
7:  $v = \Sigma_i^N \tilde{h}_{tip}^i(D, \tilde{q}_i, i)$
8:  $\bar{v} = \min(\bar{v}, v)$
9:  $\bar{q}_j^{len} = \max_i \tilde{q}_j^i$ for indices $j \in J_t$
10: end while
11: return $\bar{v}$ Prior to turning to link length optimization, it may be useful to look at results achieved in several tests or experiments using the morphology optimization module (and underlying method). The inventors validated their morphology optimization algorithm on three types of robotic devices: manipulators; modular robots; and legged robots, and excellent results were produced using a single core of a 3.40 GHz CPU.

With regard to the library of modular components available to the morphology optimization module, for all types of robots, the inventors performed their testing using two robotic kits: (a) Dynamixel 2016 with 3D printing; and (b) MOSS 2016 modular robotic kit. Manipulators and legged robots were designed on the framework of Dynamixel and 3D printing while modular robots were designed on the framework of MOSS.

Dynamixel is a commercial modular actuator with a controller and a network module. The inventors used Dynamixel servos as their actuators while links were fabricated using 3D printers. For design elements, the inventors implemented a few popular joints: one fixed joint; three hinge joints (X, Y, and Z axes); two universal joints (X-Z and Y-Z axes), and two parallel branching joints (X and Z axes). The examples are presented toward the top of the design element set (or library of modular components) 910 in FIG. 9. Fixed joints are typically only added at the root because it is identical to increasing the length of the parent links. Branching joints are typically only enabled for manipulator examples with multiple target trajectories. The link length l ranges from 10 cm to 60 cm with 5-cm discretization ($\delta$l) for manipulators and from 6 cm to 16 cm with 1-cm discretization for robots. Therefore, a branching factor of search is majorly 55=5×11 when the branching structure is disabled and 77=7×11 when it is enabled. In the validation runs of the morphology optimization module, symmetry of design was assumed for branched manipulators and quadruped robots.

Figure 9:
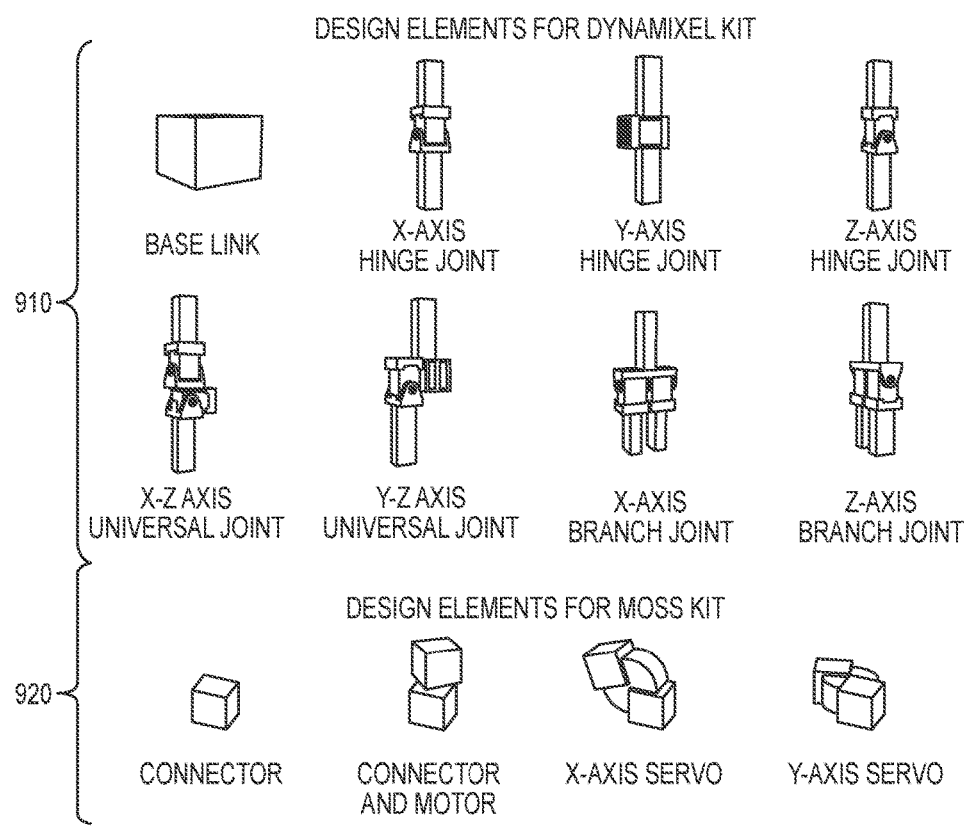
FIG. 9 illustrates two exemplary kits or libraries of modular components for selection to optimize a robot morphology.

MOSS is a commercial modular robotic kit, as shown at 920 in FIG. 9, that can create robots with various cube-shaped building blocks using magnets and steel spheres. Besides a battery and a computing unit, there exists three main building elements: connectors; servos; and motors. From the end effectors, a new building block can be attached to any of the faces. For instance, connectors can be attached to any of the six faces. A servo has 24 configurations (i.e., six base directions and four orthogonal axis directions), and a motor has six configurations (i.e., six axis directions). Therefore, a branching factor is approximately 36=6+6×4+6, while a few of them will not be available due to self-collisions.

The morphology optimization module and its methods are useful for designing manipulators, which are one of the most popular robotic devices in the industry. Concisely designed manipulators have many different advantages, such as cheap construction and maintenance costs. To validate the optimization algorithm, four tasks (user-specified tasks) were defined as manipulator examples: (a) planar; (b) non-planar; (c) circles; and (d) object moving trajectories with end effectors. For the object moving example, additional constraints are used including avoiding collisions between a manipulator and a moving object. For each link, four spherical collision shapes are embedded at lengths of 25 percent, 50 percent, 75 percent, and 100 percent and constrained not to collide with a moving object (which is also a sphere). The weight of design objectives and heuristics are listed below in Table 2.

TABLE 2

Problem Parameters

| | Manipulators | Modular Robots | Legged Robots |
|---|---|---|---|
| $^a$min l$^1$ | 0.1 m | — | 0.06 m |
| max l$^1$ | 0.6 m | — | 0.16 m |
| $\Delta$l$^1$ | 0.05 m | — | 0.01 m |
| $\in$ | 0.005 m | 0.003 m | 0.005 m |
| $w_l$ | 1.0 | 1.0 | 1.0 |
| $w_n$ | 0.3 | 0.05 | 0.1 |
| $w_t$ | 1.0 | 1.0 | 1.0 |
| $w_c$ | 100.0 | 200.0 | 100.0 | min l$^1$, max l, $\Delta$l represent the minimum, maximum, and the discretization of the link lengths, respectively.

Figure 10:
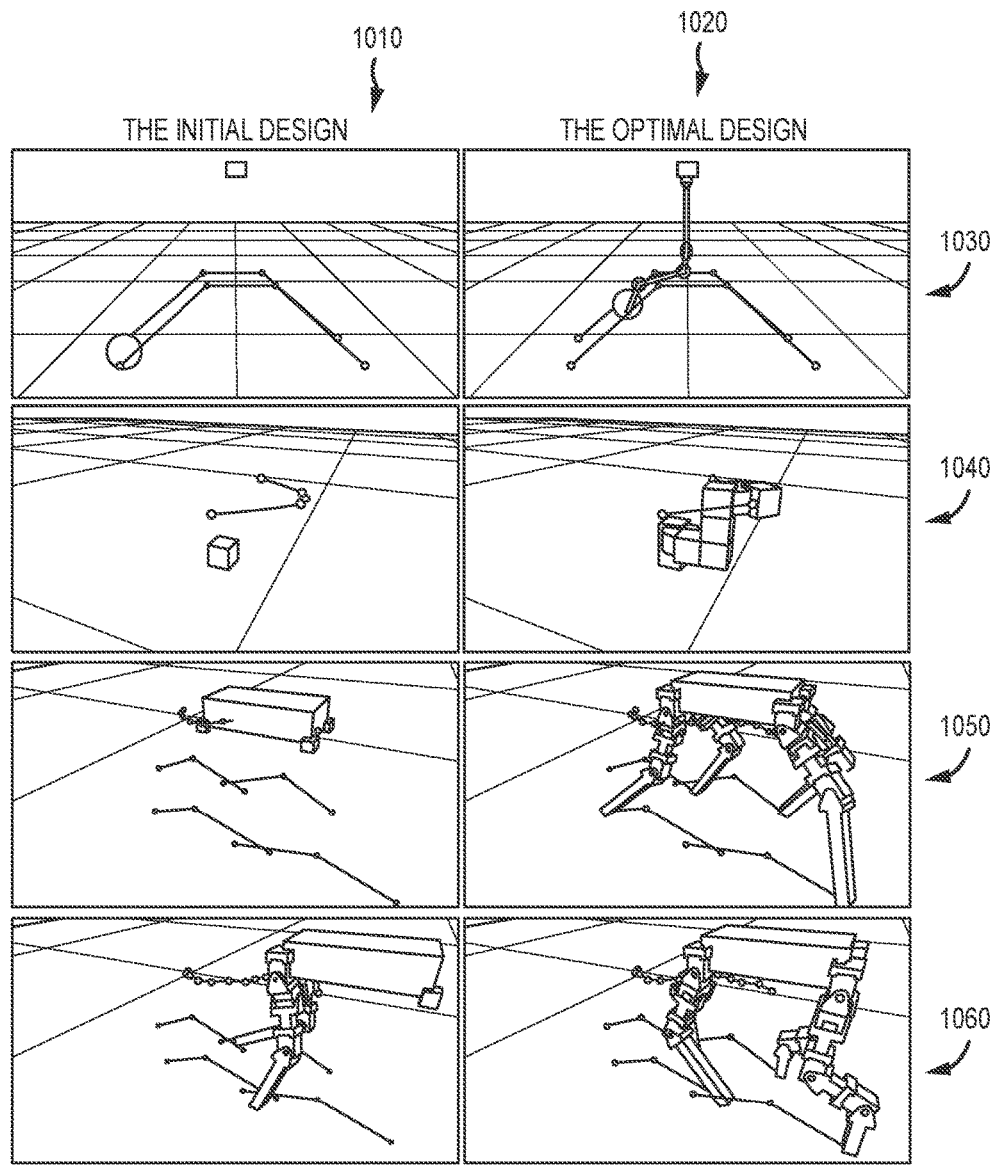
FIG. 10 illustrates initial and optimal designs (generated by a morphology optimization module or its algorithm of the present description) for four exemplary robotic systems.

The first two examples (planar and non-planar) have a single target trajectory. For the simple planar example, the algorithm finds a manipulator with two Z-axis joints, which is a solution that may still be intuitive to a human. It also well optimizes the design for a non-intuitive non-planar trajectory by using one X-Z universal joint and one Z hinge joint. For the latter two circles and object moving scenarios, two trajectories were provided by the inventors while expecting emergence of branching structures. The circle example has two half-circle trajectories with 0.3-m radius, which are located 0.32 m and 0.42 m under the base link. There exists a few different optimal manipulators with the same design costs, and the new algorithm successfully finds the one of them which has a fixed joint, a Y-Z universal joint, and a branching joint at the end. Finally, the algorithm finds the optimal design for the complex object moving scenario, which is 4 DOFs in arms with a 2-DOF gripper (while avoiding collisions). These validating designs are shown in FIG. 10 with column 1010 showing initial designs and column 1020 showing optimized designs for a robot manipulator with a gripper 1030, a robot arm (using MOSS) 1040, a forward-walking quadruped 1050, and an asymmetry stabilized quadruped 1060.

The morphology optimization algorithm is general enough to handle a wide variety of different design elements (differing libraries of modular components) such as those in a MOSS kit. To validate this assertion, the inventors applied the algorithm to designing two types of modular robots: (a) a robot arm; and (b) a suspension car. The weight of design objectives and heuristics for both problems are listed above in Table 2. For the robot arm example, a parabolic trajectory was provided as input in the X-Z plane that was 6 cm above the base unit. The algorithm successfully was run to find the optimal design, which includes two servos that are parallel to the ground and three connectors (see the initial and final designs for the robot arm example 1040 in FIG. 10).

The morphology optimization module was also successfully tested for use in the design of legged robots. One goal is to optimize design of legged robots for executing given motion plans, which can be described by a COM trajectory and end effector (e.g., a foot) trajectories. These trajectories can be generated by solving space-time optimization of centroidal dynamics or by applying the motion optimization module to process a user-specified task for a rough robot design. From the initial and final COM and end effector positions, the intermediate states can be solved that satisfy physics and minimize usage of contact forces. Besides the generated (or received) COM and end effector trajectories, additional constraints may be specified such that all COM positions of the links must be a predefined distance above the ground (e.g., at least 5 cm above the ground). The weights of design objectives and heuristics are listed above in Table 2.

In the validating run of the morphology optimization module, the designs of quadruped robots were first optimized for motion trajectories created for two simple locomotion tasks: (a) forward walking (positive Z axis) with 0.6 m/s; and (b) side walking (positive X axis) with 0.3 m/s. The trotting gait was selected for both input trajectories. As expected, two optimal designs have different joint configurations: a forward walker has an X-Z universal joint at shoulders and X hinge joints at knees while a side walker has an X-Z joint at shoulders and Z joints at knees. However, it is noted that these quadrupeds may not be able to stabilize themselves due to the point contact assumptions. Therefore, the inventors designed a new stabilized quadruped with additional objectives to orient rear end effectors horizontal. The objectives are described by additional tracking objectives at toes. For the front legs, the inventors reused the design of the previous forward walking quadruped. Therefore, the initial design is a base link and forward legs, as presented in the first column 1010 for the quadruped 1060 in FIG. 10. The optimized quadruped has three links and four joints for rear legs, with a series of an X-Z universal, X hinge, and X-hinge joints.

The use of the morphology optimization module was also used and provided design validation for a stabilized walker. The design of this stabilized quadruped was validated in the real world using design elements/library of modular components including Dynamixel XM-430 servos and 3D-printing techniques. Based on the optimized joint configurations and link dimensions, an engineer generated the link meshes and base boards. In the design, front feet have a single hemisphere-shaped tip while rear feet have two hemispheres, as optimized. All feet are covered by rubber to increase friction coefficients. Z-axis servos of universal joints are rotated 15° to maximize the margin of the range of motions. The fabricated quadruped was tethered to a desktop computer and was operated to replay the solved fullbody motion. Although the motion achieved was not exactly the same, the fabricated quadruped was able to walk forward and sideways while maintaining its balance.

Figure 11:
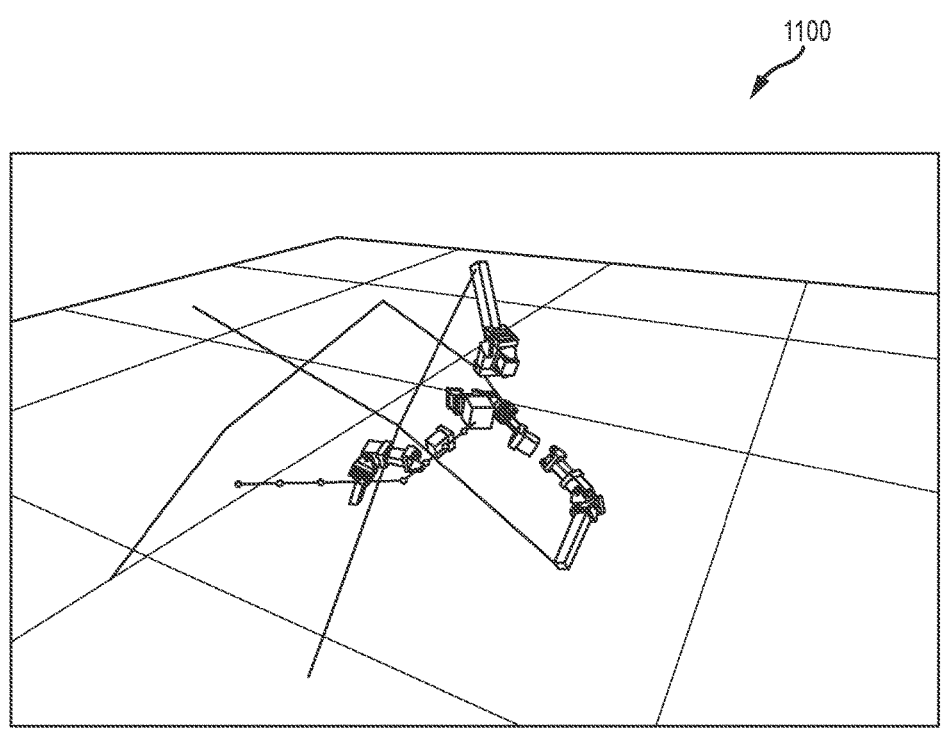
FIG. 11 illustrates a tetrahedron robot designed by the morphology optimization method described herein.

Further, a design of a spherically symmetric quadruped, which looks like a tetrahedron, was optimized using the morphology optimization algorithm. The walking mechanism of this tetrahedron robot is simple. Starting from the initial tetrahedron shape, it gradually pushes the COM toward the edge while preparing the landing with the leg on the top. By moving the COM beyond the edge of the support polygon, the robot falls toward the edge and lands on the adjacent equilateral triangle. After the landing, it goes to the initial tetrahedron shape once again. Designing the spherically symmetric robot was not intuitive (even for experts in this field) due to the non-orthogonal coordinate frames and collisions. However, the morphology optimizer was able to find a minimal robot design that has a Y-Z universal joint at knees and an X-Z universal joint at hips as shows with the robot 1100 shown in FIG. 11. The design of robot 1100 differs from some prior designs for such robots as it uses four servos per leg due to the joint velocity limits (300° per second) and link COM constraints. The design was validated in an open-source physics simulator (e.g., DART [2014]).

As a brief review of the morphology optimization module, the module may utilize a heuristic function to facilitating searching. It is likely that the A* with a tip-based heuristic function ($h_{tip}$) may be most useful when compared to also useful (in some cases) breadth-first search (BFS) and the A* with an error-based heuristic function ($h_{err}$). The inventors used a number of searched designs and search time as comparison criteria for these three embodiments of the morphology optimization module. For the BFS algorithm, the inventors only reported the minimal search node, which is defined as (branching factor)$^{(depth-1)}$+1, instead of running the actual algorithm because the performance varies a lot with respect to search orders. With regard to the use of A* with herr, the number of searched designs were reported along with the time to find the best design. With regard to A* with $h_{tip}$, the number of searched designs and the time to find both the first and best designs was reported herein because $h_{tip}$ is clearly not admissible.

The result statistics are presented below in Table 3. Note, all the search algorithms are deterministic in theory but can be a little bit stochastic in practice due to randomness in numerical solvers. In general, the tip-based heuristic shows better performance by finding the optimal design in a relatively short amount of time. It is not admissible by its definition, but its tight estimation results in a faster search with fewer nodes. However, it sometimes finds the optimal design (e.g., 720 m) a relatively long time after the first design (e.g., 264 m), due to its non-admissible property. Although the performance of BFS is estimated very optimistically, it may not be efficient for a few examples when the search depth of the optimal design is more than three. The A* with the error-based heuristic is usually three to five times slower than the A* with the tip-based heuristic, but the performance difference varies a lot with respect to different design problems. One noticeable exception is a manipulator with circular trajectories. In fact, this is a malicious example for the tip-based heuristic because all designs of manipulators can maintain the fixed distance from the target trajectory by placing the end effector at a vertical central axis of circles. Therefore, the tip-based heuristic will always evaluate the tip as rigid, and the change of tips $|\dot{q}_j^i|$ in Eq. (9) becomes zero. The tip-based heuristic becomes 2.5 times slower than the error-based heuristic, in this case, due to its additional computation cost.

TABLE 3

Statistics on Result Designs and Algorithms (+indicates max. designs searched)

| Problem | | Optimal Design | | | | |
|---|---|---|---|---|---|---|
| Type | Task | #Branches | Depth | #Servos | ΣLength | Cost |
| Manipulator | Planar | 55 | 2 | 2 | 0.85 | 1.45 |
| Manipulator | Non-planar | 55 | 2 | 3 | 0.60 | 1.50 |
| Manipulator | Circle | 77 | 3 | 4 | 0.80 | 2.00 |
| Manipulator | Object moving | 77 | 4 | 6 | 1.20 | 3.00 |
| Modular Robots | Robot arm | 36 | 6 | 2 | 0.12 | 0.22 |
| Modular Robots | Suspension car | 36 | 6 | 1 | 0.14 | 0.19 |
| Legged Robots | Forward walking | 55 | 2 | 12 | 1.04 | 2.24 |
| Legged Robots | Side walking | 55 | 2 | 12 | 0.96 | 2.16 |
| Legged Robots | Stabilized walking | 55 | 3 | 14 | 1.14 | 2.54 |
| Legged Robots | Spherical gait | 55 | 2 | 16 | 1.12 | 2.72 |

| Problem | | # Searched Designs (time) | | | |
|---|---|---|---|---|---|
| Type | Task | BFS:first | $h_{err}$ | $h_{tip}$:first | $h_{tip}$:best |
| Manipulator | Planar | 56 | 825 (5 m) | 92 (1 m) | 92 (1 m) |
| Manipulator | Non-planar | 56 | 4110 (36 m) | 589 (9 m) | 589 (9 m) |

TABLE 3-continued

Statistics on Result Designs and Algorithms (+indicates max. designs searched)

| Manipulator | Circle | 3026 | 656 (5 m) | 572 (8 m) | 782 (13 m) |
|---|---|---|---|---|---|
| Manipulator | Object moving | 166376 | 40000+ | 7821 (264 m) | 19673 (720 m) |
| Modular Robots | Robot arm | 60466177 | 10000+ | 266 (3 m) | 266 (3 m) |
| Modular Robots | Suspension car | 60466177 | 968 (6 m) | 108 (1 m) | 120 (1 m) |
| Legged Robots | Forward walking | 56 | 825 (73 m) | 165 (21 m) | 165 (21 m) |
| Legged Robots | Side walking | 56 | 715 (62 m) | 121 (15 m) | 121 (15 m) |
| Legged Robots | Stabilized walking | 3026 | 5567 (408 m) | 213 (56 m) | 331 (82 m) |
| Legged Robots | Spherical gait | 56 | 1430 (307 m) | 165 (37 m) | 165 (37 m) |

Now, with operation of the morphology optimization module/stage understood, the design program's operation can further be discussed with a fuller description of the link length optimization module or stage. This module or stage takes the optimized morphology as input along with the optimized motion (or trajectories of key components or aspects of the robot being designed/modeled). In this stage, the design program (or robot design system/framework) optimizes the design parameters to efficiently execute the given motion of the simplified model from the previous stage. One main goal of the link length optimization stage is to find the optimal lengths of the various limb links $d=\{d_1, d_2, \ldots, d_M\}$ that minimize a sum of joint torques. The number of links M is 2N for two-link legged robots and is 3N for three-link legged robots.

Figure 6:
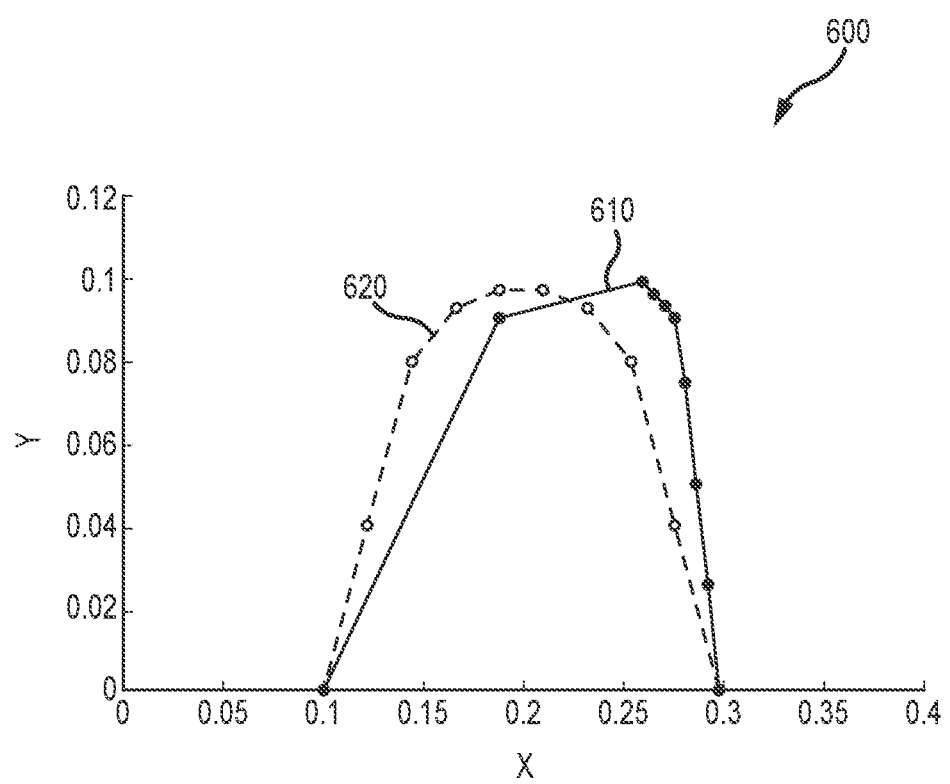
FIG. 6 provides a graph showing two exemplary swing foot trajectories that may be processed by the link length optimization module.

For locomotion tasks, additional parameters, s, can be included to modify swing foot trajectories, $\bar{p}_s^i(t)$, because it is relatively important to model the passive dynamics of the swing legs, but this cannot readily be optimized in the motion optimization stage/module. Some components of the swing foot trajectories are already determined including the desired foot clearance height, $h_{max}$ (may be given as part of the user-specified task) and the contact timings and locations for foot take-off and landing (from the optimized motion plan from the motion optimization module). Within these constraints, the link length optimization module is configured to change the horizontal location of the peak $x_{peak}$ and the time of the peak $t_{peak}$ for each ith foot as can be seen in the graph 600 of FIG. 6. Therefore, swing foot parameters s are defined as $\{x_{peak}^1, t_{peak}^1, \ldots x_{peak}^N, t_{peak}^N\}$. The graph 600 provides two examples of swing foot trajectories 610 and 620 with the same clearance height (0.2 m), take-off position (0.1 m), and landing position (0.3 m). Each dot in the trajectories 610, 620 represents the foot position at each frame. The trajectory 610 ($x_{peak}$=0.27 m, $t_{peak}$=0.05s) takes only two frames to reach the peak while the trajectory 620 ($x_{peak}$=0.2 m, $t_{peak}$=0.1 s) takes four frames.

Figure 7:
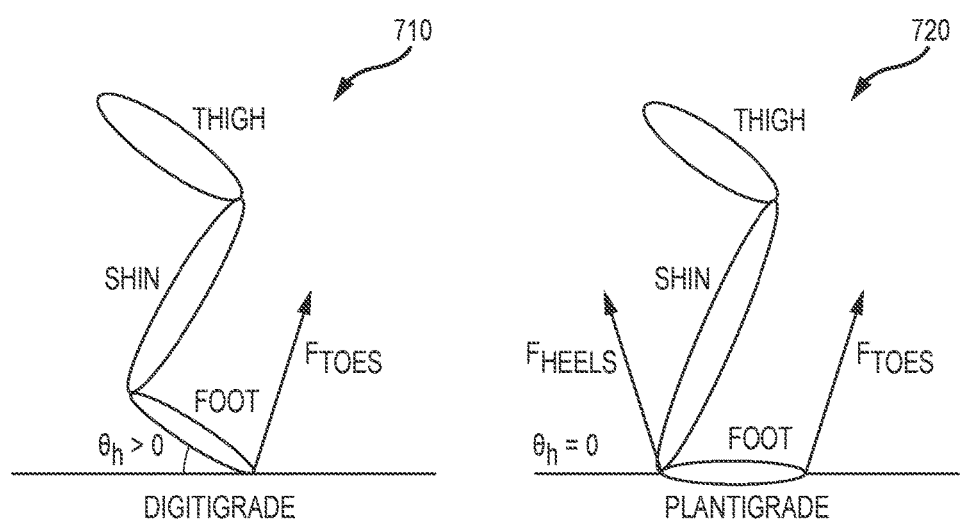
FIG. 7 illustrates schematics or graphs representing two types of three-link legs that may be processed for optimal lengths by the link length optimization module.

For three-link legs, additional parameters h can be used to define foot angle trajectories $\bar{\theta}_h^i(t)$ as splines with knobs $h=\{h_1^{knob}, \ldots h_K^{knob}\}$ (K=number of knobs). The three-link leg is digitigrade when the foot angle is greater than zero but is otherwise plantigrade and can apply contact force at its heel as shown in the graphs 710 and 720 of FIG. 7. Particularly, schematic or graph 710 shows a three-link leg that is digitigrade (the foot angle $\theta_h$>0) that can apply forces only from toes while schematic or graph 720 shows a three-link leg that is plantigrade (the foot angle $\theta_h$=0) that can apply forces from both toes and heels. Therefore, the link length optimization module is configured to treat the fullbody contact forces $\hat{f}_t^j$ as additional free variables rather than directly using the contact forces $f_t^j$ from the motion optimization stage/module. Because one foot can potentially apply forces at two points (the toes and the heel), the fullbody contact forces $\hat{f}_t^j$ has index j≤2N.

In one implementation of the link length optimization module, the design parameters d and the fullbody motion parameters s and h were optimized using CMA-ES (Covariance Matrix Adaptation-Evolution Strategy), and the objective function is provided below in Algorithm 2.

---

Algorithm 2: Objective Function in the Link Length Optimization Module or Stage

---

Require: parameters for lengths d, swing trajectory s, foot angle h.
1: for t ∈ [1 ... T] do
2:  solve $q_t$ to match the center of mass $p_t^C$, the orientation $r_t^C$, stance foot positions $p_t^1 \ldots p_t^N$, swing foot trajectories $\bar{p}^{1\ldots N}(t, s)$, and foot angles $\bar{\theta}^{1\ldots N}(t, h)$
3: end for
4: for t ∈ [1 ... T] do
5:  solve $\dot{q}_t$ for contact velocity constraints.
6: end for
7: for t ∈ [1 ... T] do
8:  solve $\ddot{q}_t$ for contact acceleration constraints.
9: end for
10: for t ∈ [1 ... T] do
11:  solve $\tau_t$, $\hat{f}_t^j$ for equations of motions.
12: end for
13: return $\Sigma_t |\tau_t|^2$

---

For the given parameters d, s, and h, the cost function (Algorithm 2) sequentially solves joint positions $q_t$, joint velocities $\dot{q}_t$, joint accelerations $\ddot{q}_t$, fullbody contact forces $\hat{f}_t^j$, and torques $\tau_t$. First, the algorithm solves the inverse kinematics (IK) for each time frame to find the joint positions $q_t$ including global position, orientation, and joint angles at time t to match the desired trajectory from the motion optimization stage. The desired trajectory includes the desired COM positions $p_t^C$, the desired COM orientation $r_t^C$, and foot positions $p_t^1 \ldots p_t^N$. If the task is locomotion, the desired swing foot trajectories $\bar{p}^i(t, s)$ are added. If the robot has three links per leg, the desired foot angle $\bar{\theta}^i(t, h)$ is also included.

The IK problem is formulated as:

$$q_t = \underset{q_t}{\operatorname{argmin}} |p^C(q_t, d) - p_t^C|^2 + |r^C(q_t, d) - r_t^C|^2 \qquad \text{Eq. (13)}$$

$$\text{s.t.} \quad p^i(q_t, d) = p_t^i \quad \forall i \text{ if } c_t^i = 1$$

$$p^i(q_t, d) = \bar{p}^i(t, s) \quad \forall i \text{ if } c_t^i = 0$$

$$\theta^i(q_t, d) = \bar{\theta}^i(t, h) \quad \forall i \leq N$$

where $p^C$, $r^C$, $p^i$, and $\theta^i$ define, respectively, the position of center of mass (COM), the global orientation, the foot position of the ith leg, and the foot angle of the ith leg for the given lengths d using forward kinematics. For two-link legs, joint angles have a unique solution under the assumption that the knee must be bent in a particular direction. For three-link legs, the foot angle trajectory $\bar{\theta}^i$ will remove the ambiguity of the solution.

Next, the link length optimization module solves for the joint velocity $\dot{q}$ to make sure that the foot does not penetrate the ground:

$$\dot{q}_t = \underset{\dot{q}_t}{\mathrm{argmin}} |\dot{q}_t - \hat{\dot{q}}_t| \quad \text{Eq. (14)}$$
$$\text{s.t. } J_t^i \dot{q}_t = 0 \forall \text{ if } c_t^i = 1$$

where $\hat{\dot{q}}$ is the target joint velocity calculated using finite difference and $J^i$ is the Jacobian matrix of the ith leg.

Similarly, the link length optimization module (or its algorithm(s)) solves the joint acceleration $\ddot{q}_t$ to hold contact non-penetration conditions:

$$\ddot{q}_t = \underset{\ddot{q}_t}{\mathrm{argmin}} |\ddot{q}_t - \hat{\ddot{q}}_t| \quad \text{Eq. (15)}$$
$$\text{s.t. } J_t^i \ddot{q}_t + \dot{J}_t^i \dot{q}_t = 0 \forall \text{ } i \text{ if } c_t^i = 1$$

where $\hat{\ddot{q}}$ is the joint acceleration calculated using finite differences.

Finally, the link length optimization module is configured to find the joint torques $\tau_t$ and fullbody contact forces $\hat{f}_j$ that minimize the squared sum of joint torques and satisfy the equations of motion:

$$\tau_t, \hat{f}_t^1, \ldots \hat{f}_t^N = \underset{\tau_t, \hat{f}_t^1, \ldots \hat{f}_t^N}{\mathrm{argmin}} |\tau_t|^2 \quad \text{Eq. (16)}$$
$$\text{s.t. } M(q_t)\ddot{q}_t + C(q_t, \dot{q}_t) + \sum_j J_t^{jT} \hat{f}_t^j = \begin{bmatrix} 0 \\ \tau_t \end{bmatrix}$$

where j is the index of the link in contact, which can be in contact at both the toes and heel. Note that the above equations do not explicitly have terms to match the desired contact forces $f_t^i$ that are calculated from the motion optimization stage with fullbody contact forces $\hat{f}_t^j$. However, this stage will result in similar contact forces because the software is written to try to realize the desired COM trajectory given by the motion optimization module or stage.

After solving the entire motion for the given parameters d, s, h, Algorithm 2 returns the squared sum of the joint torques for the given design parameters:

$$f_{design}(d, s, h) = \Sigma_t |\tau_t|^2 \quad \text{Eq. (17)}$$

Equations (14)-(16) may be solved using Quadratic Programming (QP). If one of the equations fails to find a feasible solution, the function returns a high penalty.

The inventors tested the design program when it was used to design optimized monopod and quadruped robots simulated in the 2D sagittal plane. The optimized robots were rendered in 3D in figures and videos (for visualization purposes). In the motion optimization stage, the number of discretized frames T was set to 20 with a 0.025 second time step. The maximum number of iterations for the SQP solver was set to 500 and solving took about 15 minutes. In the link length optimization stage, the number of spline knobs K for the foot angle trajectories was set as 4. For the CMA-ES algorithm, the number of parents μ and offspring as 16 and 32, respectively, and it takes around 2 hours for 100 iterations. All the results were produced on a single core of a 3.40 GHz CPU.

Figure 12:
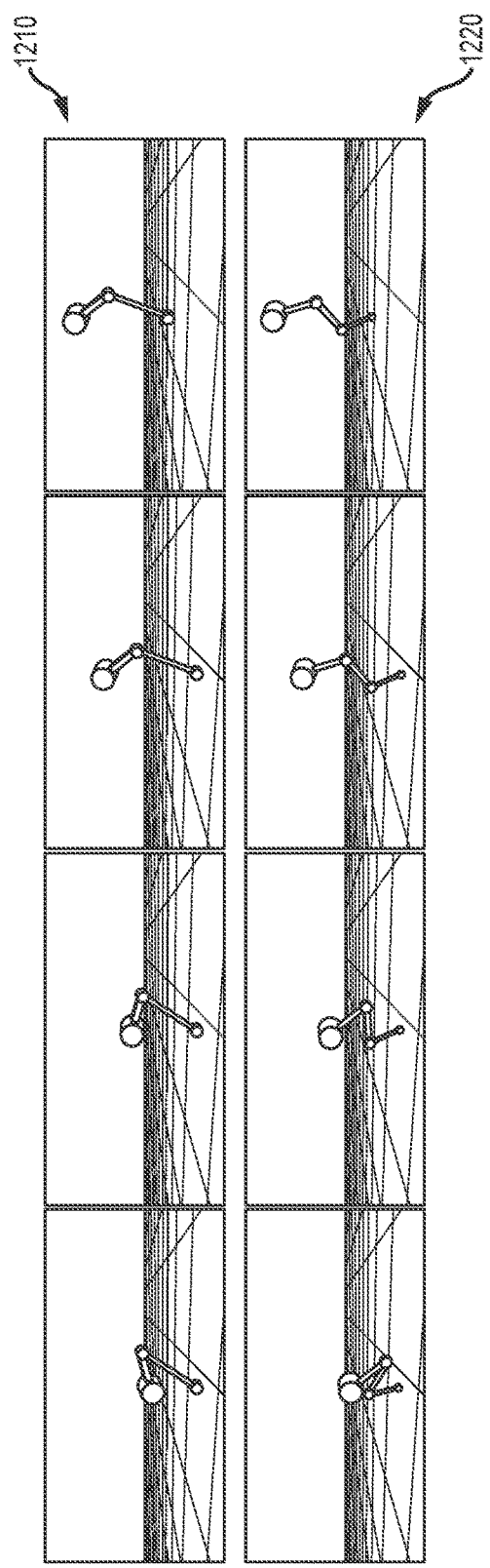
FIG. 12 illustrates optimized designs and motions for two jumping monopod robots designed using the design program of the present description.

With regard to validation of the design program used on a monopod robot, the input task for a monopod robot is jumping. The goal of jumping is to reach a COM height of a particular amount with 1 meter used in one test. The total mass of the robot was set to 1.0 kg, and the mass of a single motor was set at 0.5 kg. The motors are located at joints and connected by aluminum bars (density of 2.7 g/cm$^3$) with a 1 cm$^2$ cross section. The length of these links can range from 9 cm to 90 cm. The resulting designs and motions can be found in FIG. 12, with a jumping monopod with a two-link leg shown in row 1210 and a three-link leg shown in row 1220, and the supporting data for these two designed robots shown in the following Table 4.

TABLE 4

Task and Optimal Link Lengths for Monopods

| Task | | | Leg | | | Objective |
|---|---|---|---|---|---|---|
| Name | Target Height (m) | Robot # Links/Leg | Thigh (m) | Shin (m) | Foot | Cost (N$^2$m$^2$) |
| Jump | 1.0 | 2 | 0.304 | 0.511 | — | 57.5 |
| Jump | 1.0 | 3 | 0.339 | 0.294 | 0.254 | 30.9 |

The optimal design of the two-linked jumping robot has a shorter thigh and a longer shin (as defined by the link length optimization module) while the three-link legged robot has three links of almost equal length. Both designs try to maintain short moment arms created during the motion. The folding structure of the three-link leg allows the robot to have shorter moment arms than the two-link legged robot and results in a motion that is 46 percent more torque efficient.

The robot design program/framework was also applied to the optimization of quadruped robot designs. The input structure of a quadruped can have either two-link or three-link legs (see, for example, FIG. 2), and the left-right symmetry can be assumed. The total mass of the robot was set in one test run to 30.0 kg, and each motor mass was set to 0.7 kg. The motors were connected by aluminum bars with a 4 cm$^2$ cross section and with a length that can range from 10 cm to 80 cm. In addition, a few assumptions were made to remove ambiguous solutions. First, knees are always bent inwards, the ankles are always bent so that the feet point forward, and the locations of the hips were fixed with horizontal offsets of plus or minus 25 cm from the robot's root.

In the quadruped robot test run, the input tasks were walking (walk), a bounding gait (bound), and stair climbing (stair). The target speeds were set at 1.4 m/s, 1.0 m/s, and 0.9 m/s, respectively. All tasks assume a trotting gait except for the bounding gait task (e.g., see FIG. 3). The desired foot clearance height $h_{max}$ was set at 20 cm for walking and 10 cm for bounding. The step in the stair climbing task was assumed to be 20 cm high. In the test run, each task described one cycle of locomotion with 20 frames, except for the stair climbing task that includes two cycles with 40 frames total.

Figure 13:
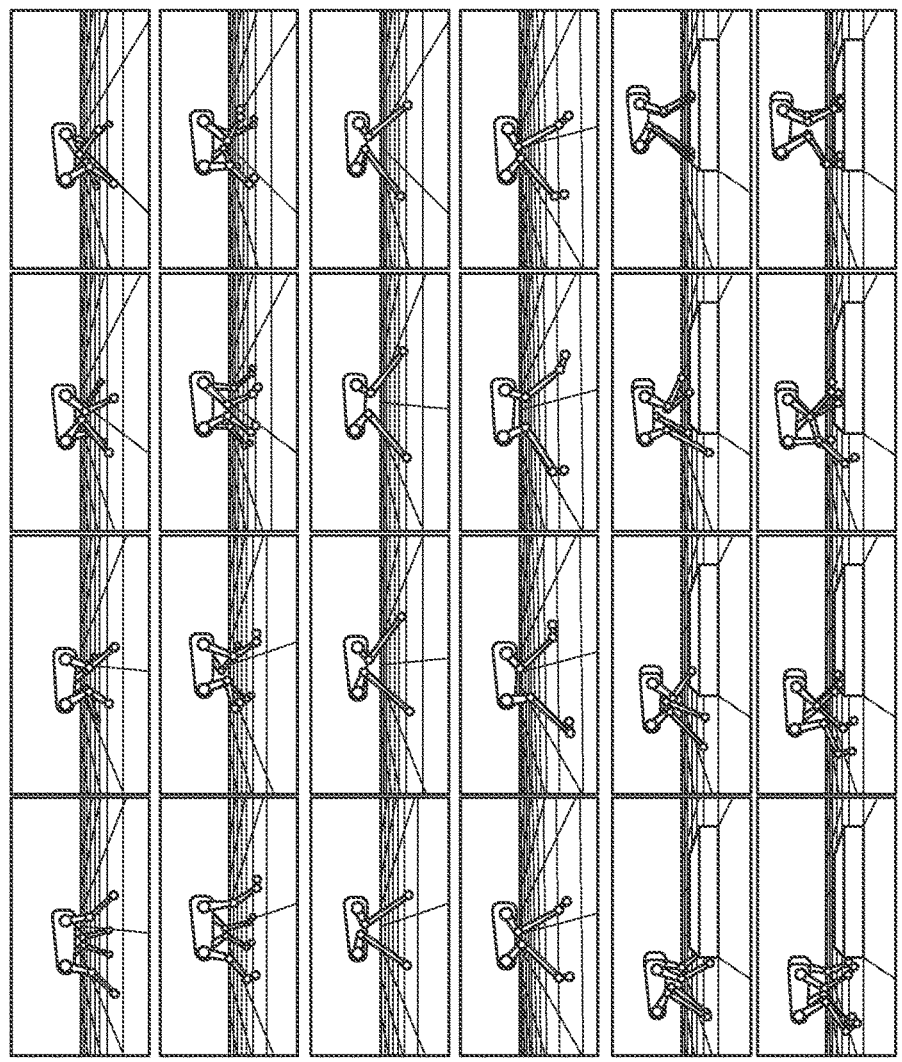
FIG. 13 illustrates optimized designs and motions for quadrupeds as designed by the robot design program of the present description for performing several user-specified tasks.

The designs of two-link and three-link legged quadrupeds were optimized for all tasks. The optimized designs and motions are shown in FIG. 13 (two-link legged robot for walking in row 1310, three-link legged robot for walking in row 1320, two-link legged robot for bounding in row 1330, three-link legged robot for bounding in row 1340, two-link legged robot for stair climbing in row 1350, and three-link legged robot for stair climbing in row 1360) with the data shown below in Table 5. For the walking task, the optimal designs have thighs and shins of relatively equal lengths, which produces the advantage of a larger workspace, therefore providing the ability to take longer steps. For the bounding gait, the optimal designs have very short thighs for applying large forces at the feet. For the stair climbing task, the design program produces a design that has longer rear legs, especially for the three-link robot.

TABLE 5

Task and Optimal Link Lengths for Quadrupeds

| Name | Task Speed | Gait | Robot #Links/ Legs | Rear Leg Thigh (m) | Shin (m) | Foot (m) |
|---|---|---|---|---|---|---|
| Walk | 1.4 | Trot | 2 | 0.292 | 0.342 | — |
| Walk | 1.4 | Trot | 3 | 0.293 | 0.308 | 0.118 |
| Bound | 1.0 | Bound | 2 | 0.222 | 0.649 | — |
| Bound | 1.0 | Bound | 3 | 0.243 | 0.521 | 0.090 |
| Stair | 0.9 | Trot | 2 | 0.264 | 0.536 | — |
| Stair | 0.9 | Trot | 3 | 0.336 | 0.385 | 0.169 |

| Front Leg Thigh (m) | Shin (m) | Foot (m) | Objective Cost ($N^2m^2$) |
|---|---|---|---|
| 0.273 | 0.358 | — | $1.61 \times 10^4$ |
| 0.349 | 0.307 | 0.090 | $2.38 \times 10^4$ |
| 0.183 | 0.587 | — | $4.15 \times 10^4$ |
| 0.210 | 0.458 | 0.162 | $5.30 \times 10^4$ |
| 0.2904 | 0.353 | — | $4.15 \times 10^4$ |
| 0.329 | 0.345 | 0.090 | $3.75 \times 10^4$ |

In general, the optimal designs indicate that three-link legged quadrupeds require more torque than two-link legged quadrupeds because three-link legs are heavier than two-link legs due to an additional servo and link. However, three-link legs show slightly better performances over two-link legs (near 10 percent) for the stair climbing task. For this task, the robot needs to exert large forces when the legs are bent. In this scenario, three-link legs are favorable, which is also the case for the jumping monopod.

Figure 14:
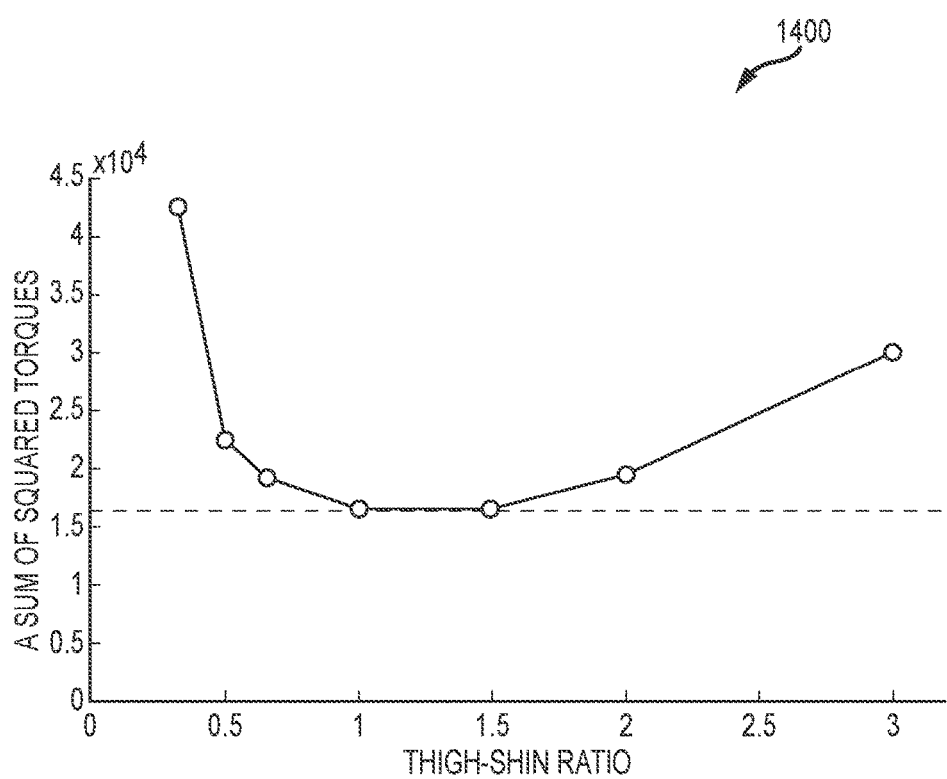
FIG. 14 is a plot or graph of cost values with respect to thigh-shin ratio for a two-link legged quadruped performing the walking task.

For two-link legged quadruped walking, the optimal ratios of the rear and front leg links are 1.17 and 1.31, respectively. These ratios are defined as $d_{shin}/d_{thigh}$ for a given leg. The inventors tested the optimality of this design by applying quadruped designs with higher and lower link ratios to the same task. For this comparison, the front and back legs were kept symmetric. For each test ratio, the inventors reran the optimization to get the best cost function for the given quadruped. The cost values were plotted with respect to link ratio as shown in graph 1400 of FIG. 14 (with the dashed line representing the cost of the optimal solution (ratio: 1.17 and 1.31)). The plot 1400 shows an optimal ratio between 1.0 and 1.5, which is similar to the produced optimal design. In the worst test case, having a short shin (ratio of 0.33) produces a cost value about three times higher than that of the optimal solution.

Directly applying the optimized link lengths, shown in Table 5, is not necessarily a fair comparison because the various tasks require different ranges of motion. Instead, only the ratio of the link lengths is taken from the optimal designs, and it is reoptimized to find the other parameters (d, s, h) for each task. The baseline design has a thigh : shin : foot ratio of 3:3:1, which approximates the average leg link ratio of a German shepherd. The performance comparison of the optimal designs for all tasks is presented below in Table 6. In general, the optimal designs perform 10 to 20 percent better than other designs on the task for which they were optimized. However, a few extreme designs require more than twice the torque of the optimal design for a given task, e.g., when the two-link legged bounding-gait design is used for walking and stair climbing.

TABLE 6

Costs of Quadruped Designs Applied to Given Tasks (Unit: $N^2m^2$).

| Task | Base | Walk | Bound | Stair |
|---|---|---|---|---|
| Two-Link Legged Quadruped Design | | | | |
| Walk | $1.65 \times 10^4$ | $1.61 \times 10^4$ | $3.16 \times 10^4$ | $1.79 \times 10^4$ |
| Bound | $5.31 \times 10^4$ | $4.95 \times 10^4$ | $4.15 \times 10^4$ | $4.71 \times 10^4$ |
| Stair | $4.62 \times 10^4$ | $4.42 \times 10^4$ | $9.71 \times 10^4$ | $4.15 \times 10^4$ |
| Three-Link Legged Quadruped Design | | | | |
| Walk | $2.51 \times 10^4$ | $2.38 \times 10^4$ | $5.20 \times 10^4$ | $3.13 \times 10^4$ |
| Bound | $6.89 \times 10^4$ | $7.63 \times 10^4$ | $5.30 \times 10^4$ | $7.38 \times 10^4$ |
| Stair | $4.35 \times 10^4$ | $4.61 \times 10^4$ | $7.02 \times 10^4$ | $3.75 \times 10^4$ |

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

With regard to the morphology optimization methods and techniques, a novel heuristics-based algorithm is taught that optimizes designs of robotic devices for the user-provided tasks. The design parameters include the number of links per limb, joint types, and link lengths. One insight provided is to formulate the morphology optimization as a shortest path-finding problem, which can be solved by an A* algorithm. For further efficiency, a novel tip-based heuristic function was developed that estimates required future lengths and degrees of freedom (DOFs). The robustness of the proposed algorithm was validated by testing on morphology optimization of various use cases (e.g., manipulators, modular robots, and legged robots). Further, the efficiency of the algorithm was demonstrated by comparing with two baseline algorithms, e.g., a breadth-first search and an A* algorithm with a simple error-based heuristic function.

To perform this analysis, several modeling simplifications were introduced. First, the motion trajectory used to specify each task was generated by considering only the centroidal dynamics and the locations of the end effectors. This simplification makes it easier to compare different robot designs against each other. However, better results may be obtained by concurrently optimizing the full motion trajectory and a robot's morphological features. Additionally, this approach will allow the optimal motions without collisions to be planned, which is not explicitly modeled in some current implementations of the design program. The inventors emphasized simplified dynamics of planar robots, but it is believed that the framework taught herein is readily extendable to 3D. This would increase the parameter space by having new free variable such as rotational axes and servo offsets. It will also introduce additional concerns such as lateral balancing.

Another simplification in the description of the design program and its algorithms is the prescribed structure of the robot. A quadruped's structure, such as its knee-bending directions or the number of links in a given leg, significantly affects the capabilities and performance of the robot, and, for this reason, current quadruped robots exhibit diverse configurations. Also, each of the designs are currently optimized for a single task. As indicated by the inventors' preliminary studies, robots designed for one task can perform other tasks as well, but their performance may be inferior when compared with a robot designed for the other tasks. Nevertheless, robots are often quite versatile, and it is believed that the design techniques taught herein can be effectively used or extended to optimize morphological features for multiple tasks. The optimization criterion described herein quantifies the performance with which motor tasks are executed. Strategies observed in nature, such as walking with straight legs, emerge automatically. Nevertheless, robustness is often important, and singular configurations can be more vulnerable to sensor or actuator noise. Hence, it may be useful in some embodiments to explicitly incorporate terms that quantify robustness in the optimization process.

In brief review, a mathematical framework was developed by the inventors to automate the design of legged robots for specific locomotion-based tasks. With the objective of minimizing joint torques while performing these tasks, the framework is able to co-design a robot's configurations and associated full body motions. To make this challenging design problem tractable, a number of simplifying assumptions were introduced. Under these assumptions, a set of experiments on monopod and quadruped robots performing various tasks were conducted such as jumping, walking, bounding, and climbing stairs. The findings of these experiments show that the cost function varies substantially with the design parameters, which indicates the usefulness of careful fine tuning of a robot's morphological features. For example, it was found that using an optimized design with two links per leg leads to better performance for simple walking tasks while optimized three-link leg morphologies are better for jumping and walking over variable terrain.

We claim:

1. A system for automating design of a robot, comprising:
   a motion optimization module, run by a processor, processing a rough design of a robot including a number of limbs for the robot and further processing a user-specified task for the robot to generate an optimized motion for the robot to perform the user-specified task; and
   a link length optimization module, run by a processor, processing the optimized motion to generate a set of link lengths for each of the limbs of the robot,
   wherein the user-specified task includes contact positions for the robot, and
   wherein the optimized motion is generated to minimize contact forces for the robot while performing the user-specified task based on the contact positions.

2. The system of claim 1, wherein the rough design further comprises an approximate body size and a number of legs.

3. The system of claim 1, wherein the optimized motion includes a trajectory of the center of mass (COM) of the robot while performing the user-specified task.

4. The system of claim 1, wherein the set of link lengths are determined by the link length optimization module as optimal lengths of links in each of the limbs of the robot that minimize a sum of joint torques for the user-specified task.

5. The system of claim 4, wherein the link length optimization module solves joint positions, joint velocities, joint acceleration, fullbody contact forces, and joint torques.

6. The system of claim 1, further comprising a morphology optimization module, run by a processor, processing as input the rough design of the robot, the user-specified task, the optimized motion, and a library of modular components for fabricating the robot to generate an optimized morphology for processing by the link length optimization module.

7. The system of claim 6, wherein the optimized morphology defines a number and type of link for each of the limbs, a location and orientation for each joint in each of the limbs, and a number and location of servos for performing the user-specified task.

8. The system of claim 6, wherein the optimized morphology is generated with an algorithm configured to solve a shortest path finding problem in a directed graph with nodes in the directed graph each corresponding to a different design of the robot.

9. The system of claim 8, wherein the algorithm comprises a best-first search algorithm including a heuristic function.

10. The system of claim 9, wherein the heuristic function is a tip-based heuristic function that estimates design costs based on a difference between current motion and a target trajectory in the optimized motion and by creating an augmented design by adding tips to end effectors of a present design for the robot.

11. A system for designing a robotic device, comprising:
    a motion optimization module, run by a processor, processing a rough design of a robotic device and a user-specified task for the robotic device to generate an optimized motion for the robotic device; and
    a morphology optimization module, run by a processor, processing as input the rough design of the robotic device, the user-specified task, the optimized motion, and a library of modular components for fabricating the robotic device to generate an optimized morphology for the robotic device,
    wherein the robotic device is a legged robot, and
    wherein the optimized morphology defines a number and type of link for each leg of the legged robot and a location and orientation for each joint in each of the legs.

12. The system of claim 11, further including a link length optimization module, run by a processor, processing the optimized motion and the optimized morphology to generate a set of link lengths for each of the legs of the robotic device.

13. The system of claim 12, wherein the set of link lengths are determined by the link length optimization module as optimal lengths of links in each of the legs of the robotic device that minimize a sum of joint torques for the user-specified task.

14. The system of claim 11, wherein the optimized morphology is generated with an algorithm configured to solve a shortest path finding problem in a directed graph with nodes in the directed graph each corresponding to a different design of the robot.

15. The system of claim 14, wherein the algorithm comprises a best-first search algorithm including a tip-based heuristic function.

16. A method for automated robot design, comprising:
    receiving a task definition for a robot including a trajectory for a COM or trajectories for end effectors;
    optimizing the trajectory of the COM or the trajectories for the end effectors to limit contact forces to provide an optimized motion for the robot; and generating a morphology for the robot by selecting a subset of components from a library of modular components to perform the optimized motion, wherein the generating the morphology includes solving a shortest path finding problem in a directed graph with nodes in the directed graph each corresponding to a different design of the robot formed using the library of modular components, wherein the robot is a legged robot, wherein the morphology defines a number and type of link for each leg of the legged robot, and wherein the method further comprises defining a length of each of the links, whereby a sum of joint torques is minimized when the robot follows the trajectory of the COM or the trajectories for the end effectors.

17. The method of claim 16, wherein the processing to generate the morphology includes performing a best-first search.

18. The method of claim 17, wherein the best-first search is an A* search with a tip-based heuristic that estimates design costs based on a difference between current motion and a target trajectory in the optimized motion and by creating an augmented design by adding tips to end effectors of a present design for the robot.

* * * * *